(12) United States Patent
Baskey et al.

(10) Patent No.: US 7,089,558 B2
(45) Date of Patent: Aug. 8, 2006

(54) INTER-PARTITION MESSAGE PASSING METHOD, SYSTEM AND PROGRAM PRODUCT FOR THROUGHPUT MEASUREMENT IN A PARTITIONED PROCESSING ENVIRONMENT

(75) Inventors: Michael E. Baskey, Wappingers Falls, NY (US); Frank J. DeGilio, Poughkeepsie, NY (US); Ann C. Merenda, Pleasant Valley, NY (US); Timothy I. Morrison, Tillson, NY (US); Christian F. Rohrbach, Poughkeepsie, NY (US); Joseph L. Temple, III, Hurley, NY (US)

(73) Assignee: International Business Machines Corporation, Armonk, NY (US)

(*) Notice: Subject to any disclaimer, the term of this patent is extended or adjusted under 35 U.S.C. 154(b) by 714 days.

(21) Appl. No.: 09/801,407

(22) Filed: Mar. 8, 2001

(65) Prior Publication Data

US 2002/0129082 A1    Sep. 12, 2002

(51) Int. Cl.
  *G06F 9/50*      (2006.01)
  *G06F 15/16*     (2006.01)
  *G06F 9/46*      (2006.01)
  *G06F 9/00*      (2006.01)
  *G06F 12/00*     (2006.01)

(52) U.S. Cl. ............... 718/104; 718/105; 709/215; 709/223; 709/224; 709/226; 715/736; 711/5

(58) Field of Classification Search ........ 718/100–104; 709/200–253; 711/5; 717/130
See application file for complete search history.

(56) References Cited

U.S. PATENT DOCUMENTS

| | | | |
|---|---|---|---|
| 5,241,594 A | 8/1993 | Kung | 380/4 |
| 5,269,009 A | 12/1993 | Herzl et al. | 395/425 |
| 5,414,851 A | 5/1995 | Brice, Jr. | 395/650 |
| 5,434,975 A | 7/1995 | Allen | 395/200 |
| 5,442,802 A | 8/1995 | Brent et al. | 395/200.08 |
| 5,586,260 A | 12/1996 | Hu | 395/200.2 |
| 5,768,503 A | 6/1998 | Olkin | 395/187.01 |
| 5,771,383 A | 6/1998 | Magee et al. | 395/680 |
| 5,931,938 A | 8/1999 | Drogichen et al. | 712/15 |
| 6,301,615 B1 * | 10/2001 | Kutcher | 709/224 |
| 6,301,616 B1 * | 10/2001 | Pal et al. | 709/226 |
| 6,314,501 B1 * | 11/2001 | Gulick et al. | 711/153 |

(Continued)

OTHER PUBLICATIONS

"Coupling Facility Configuration Options A Positioning Paper", S/390 Division, Jul. 1998, GF22-5042-00, pp. 1-29.

(Continued)

*Primary Examiner*—Lewis A. Bullock, Jr.
*Assistant Examiner*—Kenneth Tang
(74) *Attorney, Agent, or Firm*—John E. Campbell; Floyd A. Gonzalez

(57) ABSTRACT

A partitioned processing system is disclosed wherein a workload calculation is implemented for at least one partition. CPU utilization and I/O throughput information is used in calculating resource control parameters which is indicative of resource usage for the partition. The system collects and analyzes the computer system capacity data in a partition which determines a sizing metric. The system includes a manager in the computer system which issues a command to obtain throughput information of a computer system first partition, and issues a command to obtain resource utilization information of the computer system first partition. The manager then calculates a resource control parameter using the information obtained. The system includes a monitor which indicates resource allocation responsive to the resource control.

54 Claims, 17 Drawing Sheets

U.S. PATENT DOCUMENTS

| | | |
|---|---|---|
| 6,510,496 B1 | 1/2003 | Tarui et al. ............... 711/147 |
| 6,542,926 B1 | 4/2003 | Zalewski et al. ........... 709/213 |
| 6,789,054 B1* | 9/2004 | Makhlouf ..................... 703/6 |
| 2002/0129127 A1* | 9/2002 | Romero et al. ............. 709/220 |

OTHER PUBLICATIONS

"S/390 Cluster Technology: Parallel Sysplex", by J. M. Nick et al, IBM Systems Journal, vol. 36, No. 2, 1997, pp. 172-201.

MQSeries—"Queue Manager Clusters", Fourth Edition, Nov. 2000, SC34-5349-03.

OS/390 "Open Systems Adapter Support Facility User's Guide For OSA-2", Seventh Edition, Jun. 1999, SC28-1855-06.

Enterprise Systems Architecture /390, Principles of Operation, Seventh Edition, Jul. 1999, SA22-7201-06.

* cited by examiner

1000

| MVXL | Count | Destination | Source |
|------|-------|-------------|--------|

Figure 10

1101. User calls Device Driver
- Supplies
    Source Network ID
    Source Offset
    Destination Network ID
1102. Device driver transfers addresses to Adapter
1103. Adapter Translates Addresses
- Looks up Phyical Base addresses from ID's (Table Lookup)
- Obtains Lock and current Destination Offset
- Adds offsets
- Checks bounds
1104. Adapter loads count and addresses in registers
1105. Adapter executes Data Move
1106. Adapter Frees Lock
1107. Adapter notifies device Driver which "Returns" to user

Figure 11

1201. User calls Device Driver
- Supplies
    Source Network ID
    Source Offset
    Destination Network ID
1202. Device driver sends addresses to adapter
1203. Adapter Translates
- Looks up Phyical Base addresses from ID's (Table Lookup)
- Obtains Lock and current Destination Offset*
- Adds offsets
- Checks bounds
- Returns Lock and Physical addresses to Device Driver
1204. Device Driver executes Data Move
1205. Device Driver Frees Lock
1206. Device Driver Returns

Figure 12

INTER-PARTITION MESSAGE PASSING METHOD, SYSTEM AND PROGRAM PRODUCT FOR THROUGHPUT MEASUREMENT IN A PARTITIONED PROCESSING ENVIRONMENT

CROSS REFERENCE TO RELATED APPLICATIONS

This application is related, and cross-reference may be made to the following co-pending U.S. patent applications filed on even date herewith, each assigned to the assignee hereof, and each incorporated herein by reference:

U.S. patent Ser. No. 09/801,993 to Kubala et al. for INTER-PARTITION MESSAGE PASSING METHOD, SYSTEM AND PROGRAM PRODUCT FOR MANAGING WORKLOAD IN A PARTITIONED PROCESSING ENVIRONMENT;

U.S. patent Ser. No. 09/802,185 to Baskey et al. for INTER-PARTITION MESSAGE PASSING METHOD, SYSTEM AND PROGRAM PRODUCT FOR A SHARED I/O DRIVER; and U.S. patent Ser. No. 09/801,492 to Baskey et al. for INTER-PARTITION MESSAGE PASSING METHOD, SYSTEM AND PROGRAM PRODUCT FOR A SECURITY SERVER IN A PARTITIONED PROCESSING ENVIRONMENT.

FIELD OF THE INVENTION

This invention relates in general to partitioned data processing systems and in particular to uni-processor and multiprocessor systems capable of running multiple operating system images in the system's partitions, wherein each of the multiple operating systems may be an image of the same operating system in a homogeneous partitioned processing environment or wherein a plurality of operating systems are supported by the multiple operating system images in a heterogeneous partitioned processing environment.

BACKGROUND OF THE INVENTION

Most modern medium to large enterprises have evolved their IT infrastructure to extend the reach of their once centralized "glass house" data center throughout, and in fact beyond the bounds of their organization. The impetus for such evolution is rooted, in part, in the desire to interconnect heretofore disparate departmental operations, to communicate with suppliers and customers on a real-time basis, and is fueled by the burgeoning growth of the Internet as a medium for electronic commerce and the concomitant access to interconnection and business-to-business solutions that are increasingly being made available to provide such connectivity.

Attendant to this recent evolution is the need for modern enterprises to dynamically link many different operating platforms to create a seamless interconnected system. Enterprises are often characterized by a heterogeneous information systems infrastructure owing to such factors as non-centralized purchasing operations, application-based requirements and the creation of disparate technology platforms arising from merger related activities. Moreover, the desire to facilitate real-time extra-enterprise connectivity between suppliers, partners and customers presents a further compelling incentive for providing connectivity in a heterogeneous environment.

In response to a rapidly growing set of customer requirements, information technology providers have begun to devise data processing solutions that address these needs for extended connectivity for the enterprise data center.

Background information related to subject matter in this specification includes: U.S. patent Ser. No. 09/183,961 "COMPUTATIONAL WORKLOAD-BASED HARDWARE SIZER METHOD, SYSTEM AND PROGRAM PRODUCT" Ruffin et al. which describes analyzing the activity of a computer system; U.S. patent Ser. No. 09/584,276 "INTER-PARTITION SHARED MEMORY METHOD, SYSTEM AND PROGRAM PRODUCT FOR A PARTITIONED PROCESSING ENVIRONMENT" Temple et al. which describes shared memory between logical partitions; U.S. patent Ser. No. 09/253,246 "A METHOD OF PROVIDING DIRECT DATA PROCESSING ACCESS USING QUEUED DIRECT INPUT-OUTPUT DEVICE" Baskey et al which describes high bandwidth integrated adapters; U.S. patent Ser. No. 09/583,501 "Heterogeneous Client Server Method, System and Program Product For A Partitioned Processing Environment" Temple et al. which describes partitioning two different client servers in a system; IBM document SG24-5326-00 "OS/390 Workload Manager Implementation and Exploitation" ISBN: 0738413070 which describes managing workload of multiple partitions; and IBM document SA22-7201-06 ESA/390 Principles of Operation which describes the ESA/390 Instruction set architecture. These documents are incorporated herein by reference.

Initially, the need to supply an integrated system which simultaneously provides processing support for various applications which may have operational interdependencies, has led to an expansion in the market for partitioned multiprocessing systems. Once the sole province of the mainframe computer (such as the IBM S/390 system), these partitioned systems, which provide the capability to support multiple operating system images within a single physical computing system, have become available from a broadening spectrum of suppliers. For example, Sun Microsystems, Inc. has recently begun offering a form of system partitioning in the Ultra Enterprise 10000 high-end server which is described in detail in U.S. Pat. No. 5,931,938 to Drogichen et al. for "Multiprocessor Computer Having Configurable Hardware System Domains" filed Dec. 12, 1996 issued Aug. 3, 1999 and assigned to Sun Microsystems, Inc. Other companies have issued statements of direction indicating their interest in this type of system as well.

This industry adoption underscores the "systems within a system" benefits of system partitioning in consolidating various computational workloads within an enterprise onto one (or a few) physical server computers, and for simultaneously implementing test and production level codes in a dynamically reconfigurable hardware environment. Moreover, in certain partitioned multiprocessing systems such as the IBM S/390 computer system as described in the aforementioned cross-referenced patent applications, resources (including processors, memory and I/O) may be dynamically allocated within and between logical partitions depending upon the priorities assigned to the workload(s) being performed therein (IBM and S/390 are registered trademarks of International Business Machines Corporation). This ability to enable dynamic resource allocation based on workload priorities addresses long-standing capacity planning problems which have historically led data center managers to intentionally designate an excessive amount resources to their anticipated computational workloads to manage transient workload spikes.

While these partitioned systems facilitate the extension of the data center to include disparate systems throughout the enterprise, currently these solutions do not offer a straightforward mechanism for functionally integrating heterogeneous or homogeneous partitioned platforms into a single inter operating partitioned system. In fact, while these new servers enable consolidation of operating system images within a single physical hardware platform, they have not adequately addressed the need for inter-operability among the operating systems residing within the partitions of the server. This inter-operability concern is further exacerbated in heterogeneous systems having disparate operating systems in their various partitions. Additionally, these systems typically have not addressed the type of inter-partition resource sharing between such heterogeneous platforms which would enable a high-bandwidth, low-latency interconnection between the partitions. It is important to address these inter-operability issues since a system incorporating solutions to such issues would enable a more robust facility for communications between processes running in distinct partitions so as to leverage the fact that while such application are running on separate operating system, they are, in fact, local with respect to one another.

In the aforementioned U.S. patent Ser. No. 09/584,276 "INTER-PARTITION SHARED MEMORY METHOD, SYSTEM AND PROGRAM PRODUCT FOR A PARTITIONED PROCESSING ENVIRONMENT" by Temple et al., extensions to the "kernels" of the several operating systems facilitate the use of shared storage to implement cross partition memory sharing. A "kernel" is the core system services code in an operating system. While network message passage protocols can be implemented on the interface thus created, it is often desirable to enable efficient inter process communication without resorting to modification of one or more of the operating systems. It is also often desirable to avoid limiting the isolation of partitions in order to share memory regions as in aforementioned U.S. patent Ser. No. 09/584,276 by Temple et al. or as in the Sun Microsystems Ultra Enterprise 10000 high end server, as described in U.S. Pat. No. 5,931,938. At the same time it is desirable to pass information between partitions at memory speed instead of network speed. Thus a way to move memory between partition memories without sharing addresses is desired.

The IBM S/390 Gbit Ethernet (Asynchronous Coprocessor Data Mover Method and Means, U.S. Pat. No. 5,442,802, issued Aug. 15, 1995 and assigned to IBM) I/O adapter can be used to move data from one partition's kernel memory to another, but the data is moved from the first kernel memory to a queue buffer on the adapter and then transferred to a second queue buffer on the adapter before being transferred to a second kernel memory. This means that there is a total of three data movements in the transfer from memory to memory. In any message passing communications scheme, it is desirable to minimize the number of data movement operations so that the latency of data access approaches that of a single store and fetch to and from a shared storage. A move function has three data move operations for each block of data transferred. A way to remove one or two of these operations is desired.

Similarly, the IBM S/390 Parallel Sysplex Coupling Facility machine can and is used to facilitate inter partition message passing. However, in this case the transfer of data is from a first Kernel Memory to the coupling facility and then from the coupling facility to a second Kernel Memory. This requires two data operations rather than the single movement desired.

In many computer systems it is desirable to validate the identity of a user so that improper use of the data and applications on the machine through unauthorized or unwarranted access is prevented. Various operating and application systems have user authentication and other security services for this purpose. It is desirable to have users entering the partitioned system or indeed any cluster or network of systems to be validated only once on entry or at critical checkpoints such as request for critical resources, or execution of critical system maintenance functions. This desire is known as the "Single Sign on" requirement. Because of this the security servers of the various partitions must interact or be consolidated. Examples of this are the enhancement of the OS/390 SAF (RACF) interface to handle "digital certificates" received from the web, mapping them to the traditional user ID and password validation and entitlement within OS/390, Kerberos security servers, and the emerging LDAP standard for directory services.

Furthermore, because of the competitive nature of e-Commerce the performance of user authentication and entitlement is more important than in traditional systems. While a worker may expect to wait to be authenticated at the start of the day, a customer may simply go elsewhere if authentication takes too long. The use of encryption, because of the public nature of the web, exacerbates this problem. It is also often the case, that a device driver exists in one operating system that has not been written for others. In such cases it is desirable to interface to the device driver in one partition from another partition in an efficient manner. Only network connections are available for this type of operation today.

One of the problems with distributed systems is the management of "white space" or under utilized resources in one system, while other systems are over utilized. There are workload balancers such as IBM's LoadLeveler or Parallel Sysplex features of the OS/390 operating system workload manager which move work between systems or system images. It is possible and desirable in a partitioned computing system to shift resources rather than work between partitions. This is desirable because it avoids the massive context switching and data movement that comes with function shifting.

The "Sysplex Sockets" for IBM S/390 which uses the external clustering connections of the Sysplex to implement a UNIX operating system socket-to-socket connection is an example of some of the prior art. There, a service indicates the level of security available and sets up the connection based on the application's indication of security level required. However, in that case, encryption is provided for higher levels of security, and the Sysplex connection itself has a physical transport layer which was much deeper than the memory connections implemented by the present invention.

Similarly, a web server providing SSL authentication and providing certificate information (as a proxy) to a web application server can be seen as another example where sharing memory or direct memory to memory messages of the present invention are used to advantage. Here the proxy does not have to re-encrypt the data to be passed to the security server, and furthermore does not have a deep connection interface to manage. In fact it will be seen by those skilled in the art that in this embodiment of our invention the proxy server essentially communicates with the security server through a process which is essentially the same as a proxy server running under the same operating system as the security server. U.S. patent Ser. No. 09/411,417 "Methods, Systems and Computer Program Products for Enhanced Security Identity Utilizing an SSL Proxy" Baskey et al. discusses the use of proxy server to perform the secure sockets layer (SSL) in the secure HTTP protocol.

SUMMARY OF THE INVENTION

The foregoing problems and shortcomings of the prior art are addressed and overcome and further advantageous features are provided by the present invention which includes a partitioned computer system capable of supporting multiple heterogeneous operating system images wherein these operating system images may concurrently pass messages between their memory locations at memory speed without sharing memory locations. This is done by using an I/O adapter with a special device driver which together facilitate the movement of data from one kernel memory space of one partition directly to the kernel memory space of second partition.

One embodiment of the invention includes a system which collects and analyzes the computer system capacity data in a partition which determines a sizing metric. The system includes a manager in the computer system which issues a command to obtain throughput information of a computer system first partition, and issues a command to obtain resource utilization information of the computer system first partition. The manager then calculates a resource control parameter using the information obtained. The system includes a monitor which indicates resource allocation responsive to the resource control.

In an embodiment of the invention, the shared memory resource is independently mapped to the designated memory resource for plural inter operating processes running in the multiple partitions. In this manner, the common shared memory space is mapped by the process in each of the partitions sharing the memory resource to appear as memory resource assigned within the partition to that process and available for reading an writing data during the normal course of process execution.

In a further embodiment, the processes are interdependent and the shared memory resource may store from either or both processes for subsequent access by either or both processes.

In yet a further embodiment of the invention, the system includes a protocol for connecting the various processes within the partitions to the shared memory space.

In a another embodiment of the invention, the direct movement of data from a partition's kernel space to another partition's kernel space is enabled by an I/O adapter, which has physical access to all physical memory regardless of the partitioning. The ability of an I/O adapter to access all of memory is a natural consequence of the functions in a partitioned computer system which enables I/O resource sharing among the partitions. Such sharing is described in U.S. Pat. No. 5,414,851 issued May 9, 1995 for METHOD AND MEANS FOR SHARING I/O RESOURCES BY A PLURALITY OF OPERATING SYSTEMS, incorporated herein by reference. However the new and inventive adapter has the ability to move data from directly from one partition's memory to another partition's memory using a data mover.

In a further embodiment of the invention, the facilities for movement of data between kernel memories are implemented within the hardware and device driver of a network communication adapter.

In yet a further embodiment of the invention the network adapter is driven from a TCP/IP stack in each which is optimized for a local but heterogeneous secure connection through the memory to memory interface.

In another embodiment of the invention the data mover itself is implemented in the communication fabric of the partitioned processing system and controlled by the I/O adapter facilitating an even more direct memory to memory transfer.

In yet another embodiment of the invention, the data mover is controlled by the microcode of a privileged CISC instruction which can translate network addresses and offsets supplied as operands into physical addresses, whereby it performs the equivalent to a move character long instruction (IBM S/390 MVCL instruction, see IBM Document SA22-7201-06 "ESA/390 Principles of Operation") between physical addresses which have real and virtual addresses in two partitions.

In yet another embodiment of the invention, the data mover is controlled by a routine running in the hypervisor which has virtual and real memory access to all of physical memory and which can translate network addresses and offsets supplied as operands into physical addresses, whereby it performs the equivalent to a move character long instruction (IBM S/390 MVCL) between addresses which have real and virtual addresses in two partitions.

By implementing a server process in one of the partitions and client processes in other partitions, the partitioned system is capable of implementing a heterogeneous single system client server network. Since existing client/server processes typically inter-operate by network protocol connections they are easily implemented on message passing embodiments of the present invention gaining performance and security advantages without resorting to interface changes. However, implementation of client/server processes on the shared memory embodiments of the present invention can be advantageous in either performance or speed of deployment or both.

In a further embodiment of the present invention, the trusted/protected server environment is offered for application servers utilizing the shared memory or memory-to-memory message passing. This avoids the security exposure of externalizing authorization and authentication data without requiring additional encryption or authorization as in the current art.

In a specific embodiment of the present invention the Web server is the Linux Apache running under Linux for OS/390 communicating though a memory interface to a "SAF" security interface running under OS/390, Z/OS or VM/390. In this embodiment the Linux "Pluggable Authentication Module" is modified to drive the SAF interface through the memory connection.

In a further embodiment of the present invention a security server like Policy Director or RACF is modified so that the security credentials/context is stored in the shared memory or replicated via memory to memory transfers.

BRIEF DESCRIPTION OF THE DRAWINGS

The subject matter which is regarded as constituting the invention is particularly pointed out and distinctly claimed in the claims at the conclusion of the specification. The foregoing and other objects, features and advantages of the invention are apparent from the following detailed description taken in conjunction with the accompanying drawings in which:

FIG. 10 shows an example format of a IBM S/390 move instruction;

FIG. 11 shows example steps of performing an Adapter Data Move;

FIG. 12 shows example steps of performing a processor data move;

DETAILED DESCRIPTION OF THE PREFERRED EMBODIMENT

Before discussing the particular aspects of a preferred embodiment of the present invention, it will be instructive to review the basic components of a partitioned processing system. Using this as a backdrop will afford a greater understanding as to how the present inventions particular advantageous features may be employed in a partitioned system to improve the performance thereof. Reference should be made to IBM Document SC28-1855-06 "OS/390 V2R7.0 OSA/SF User's Guide" This book describes how to use the Open Systems Adapter Support Facility (OSA/AF), which is an element of the OS/390 operating system. It provides instructions for setting up OSA/SF and using either an OS/2 interface or OSA/SF commands to customize and manage OSAS. G321-5640-00 "S/390 cluster technology: Parallel Sysplex" describes a clustered multiprocessor system developed for the general-purpose, large-scale commercial marketplace. The S/390 Parallel Sysplex system is based on an architecture designed to combine the benefits of full data sharing and parallel processing in a highly scalable clustered computing environment. The Parallel Sysplex system offers significant advantages in the areas of cost, performance range, and availability. The IBM publication SC34-5349-01 "MQSeries Queue Manager Clusters" describes MQSeries queue manager clusters and explains the concepts, terminology and advantages of clusters. It summarizes the syntax of new and changed commands and shows a number of examples of tasks for setting up and maintaining clusters of queue managers. The IBM publication SA22-7201-06 "ESA/390 Principles of Operation" contains, for reference purposes, a detailed definition of the ESA/390 architecture. It is written as a reference for use primarily by assembler language programmers and describes each function at the level of detail needed to prepare an assembler language program that relies on that function; although anyone concerned with the functional details of ESA/390 will find it useful.

The aforementioned documents provide examples of the present state of the art and will be useful in understanding the background of the invention. These references are incorporated herein by reference.

Figure 1:
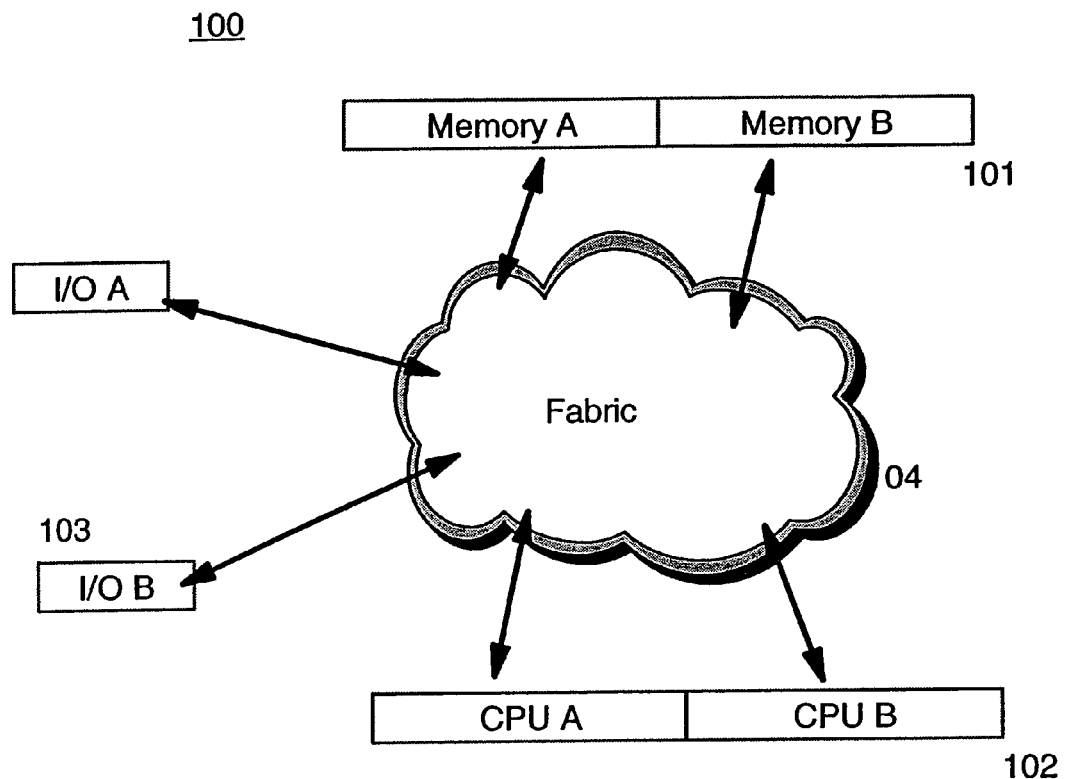
FIG. 1 illustrates a general overview of a partitioned data processing system.

Referring to FIG. 1, the basic elements constituting a partitioned processing system 100 is depicted. The system 100 is comprised of a memory resource block 101 which consists of a physical memory resource which is capable of being partitioned into blocks which are illustrated as blocks A and B, a processor resource block 102 which may consist of one or more processors which may be logically or physically partitioned to coincide with the partitioned memory resource 101, and an input/output (I/O) resource block 103 which may be likewise partitioned. These partitioned resource blocks are interconnected via an interconnection fabric 104 which may comprise a switching matrix, etc. It will be understood that the interconnection fabric 104 may serve the function of interconnecting resources within a partition, such as connecting processor 102B to memory 101B and may also serve to interconnect resources between partitions such as connecting processor 102A to memory 101B. The term "Fabric" used in this specification is intended to mean the generic methods known in the art for interconnecting elements of a system. It may be a simple point to point bus or a sophisticated routing mechanism. While the present set of figures depicts systems having two partitions (A and B) it will be readily appreciated that the such a representation has been chosen to simplify this description and further that the present invention is intended to encompass systems which may be configured to implement as many partitions as the available resources and partitioning technology will allow.

Upon examination, it will be readily understood that each of the illustrated partitions A and B taken separately comprise the constituent elements of a separate data processing system i.e., processors, memory and I/O. This fact is the characteristic that affords partitioned processing systems their unique "systems within a system" advantages. In fact, and as will be illustrated herein, the major distinction between currently available partitioned processing systems is the boundary along which the system resources may be partitioned and the ease with which resources may be moved across these boundaries between partitions.

The first case, where the boundary separating partitions is a physical boundary, is best exemplified by the Sun Microsystems Ultra Enterprise 10000 system. In the Ultra Enterprise 10000 system, the partitions are demarked along physical boundaries, specifically, a domain or partition consists of one or more physical system boards each of which comprises a number of processors, memory and I/O devices. A domain is defined as one or more of these system boards and the I/O adapters attached thereto. The domains are in turn interconnected by a proprietary bus and switch architecture.

Figure 2:
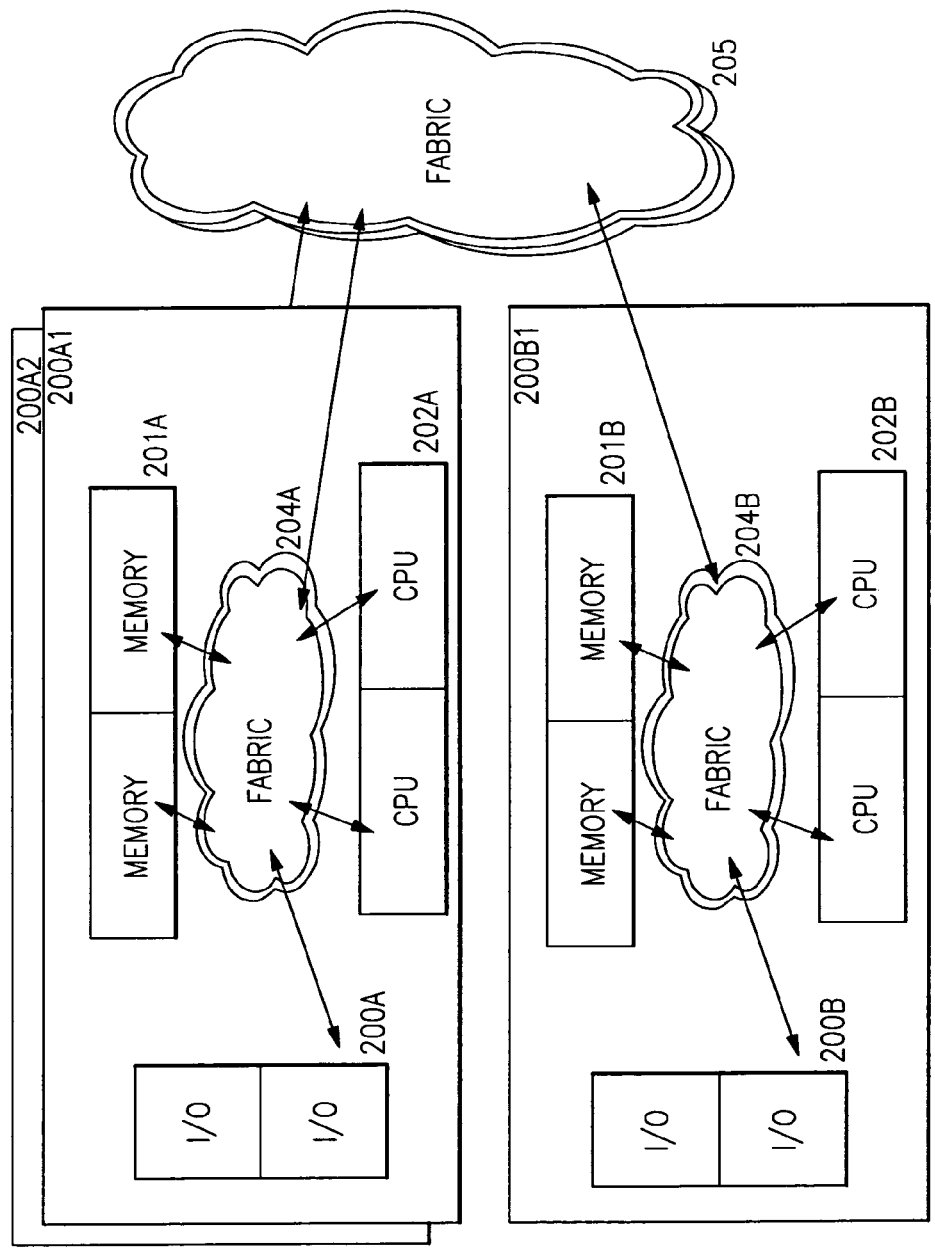
FIG. 2 depicts a physically partitioned processing system having partitions comprised or one or more system boards.

FIG. 2 illustrates a high level representation of the elements constituting a physically partitioned processing system 200. As can be seen via reference to FIG. 2, the system 200 includes two domains or partitions A and B. Partition A is comprised of two system boards 201A1 and 201A1. Each system board of partition A includes memory 201A, processors 202A, I/O 203A and an interconnection medium 204A.

Interconnection medium 204A allows the components on system board 201A1 to communicate with one another. Similarly, partition B, which is comprised of a single system board includes like constituent processing elements: memory 201B, processors 202B, I/O 203B and interconnect 204B. In addition to the system boards grouped into partitions, there exists an interconnection fabric 205 which is coupled to each of the system boards and permits interconnections between system boards within a partition as well as the interconnection of system boards in different partitions.

The next type of system partition is termed logical partitioning. In such systems there is no physical boundary constraining the assignment of resources to the various partitions, but rather the system may be viewed as having an available pool of resources, which, independent of their physical location, may be assigned to any of the partitions. This is a distinction between a physically partitioned system wherein, for example, all of the processors on a given system board (such as system board 201A1) are, of necessity, assigned to the same partition. The IBM AS/400 system exemplifies a logically partitioned dedicated resource processing system. In the AS/400 system, a user may include processors, memory and I/O in a given partition irrespective of their physical location. So, for example, two processors physically located on the same card may be designated as resources for two different partitions. Likewise, a memory resource in a given physical package such as a card may have a portion of its address space logically dedicated to one partition and the remainder dedicated to another partition.

Figure 3:
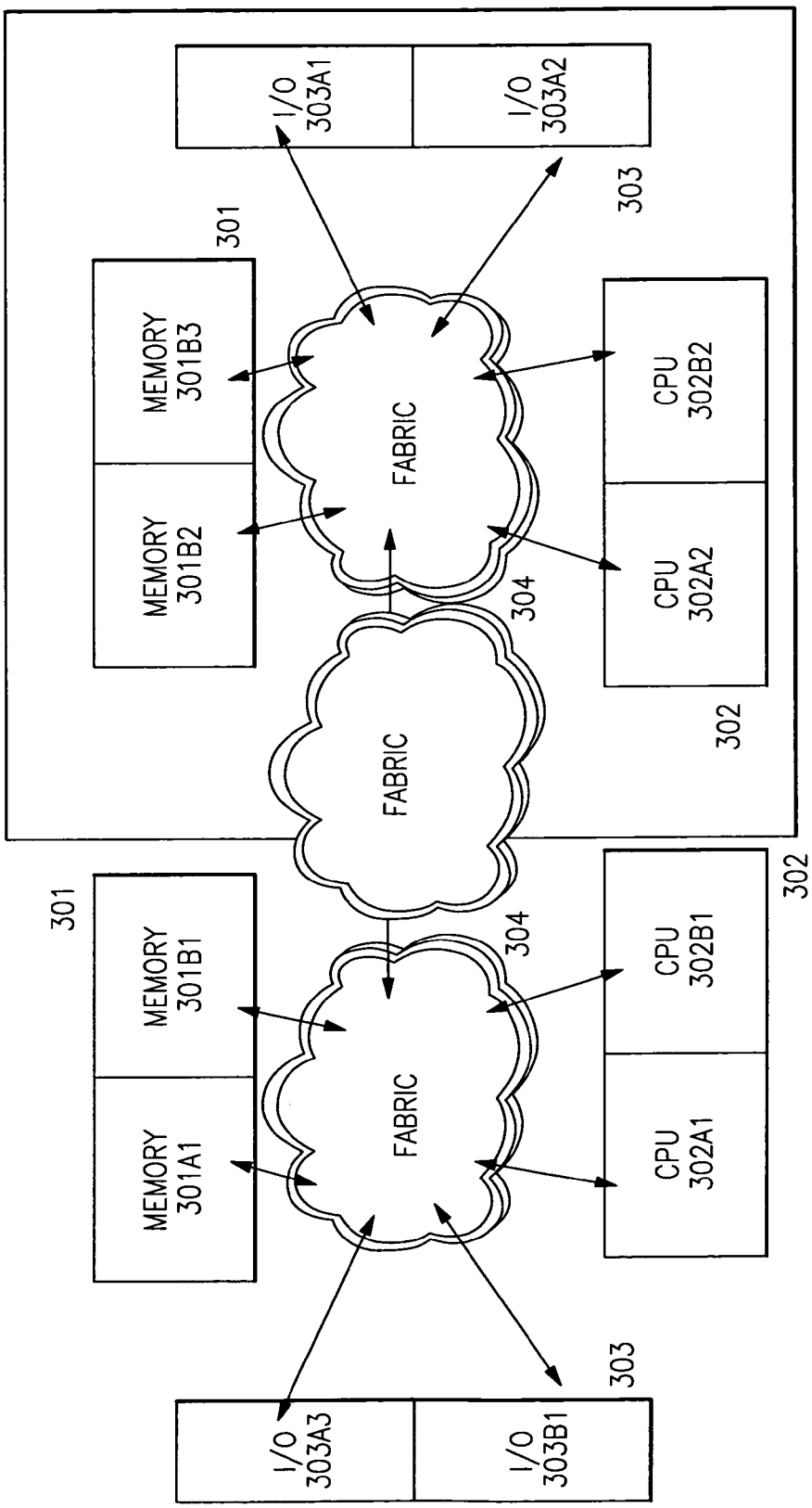
FIG. 3 illustrates a logically partitioned processing system wherein the logically partitioned resources are dedicated to their respective partitions.

A characteristic of logically partitioned dedicated resource systems, such as the AS/400 system, is that the logical mapping of a resource to a partition is a statically performed assignment which can only undergo change by manual reconfiguration of the system. Referring to FIG. 3, the processor 302A1 represents a processor that can be physically located anywhere in the system and which has been logically dedicated to partition A. If a user wishes to re-map processor 302A1 to partition B, the processor would have to be taken off-line and manually re-mapped to accommodate the change. The logically partitioned system provides a greater granularity for resource partitioning as it is not constrained by the limitation of a physical partitioning boundary such as the a system board which, for example, supports a fixed number of processors. However, reconfiguration of such a logically partitioned, dedicated resource system cannot be undertaken without disrupting the operation of the resource undergoing the partition remapping. It can therefore be seen, that while such a system avoids some of the limitations inherent in a physically partitioned system, it still has reconfiguration restraints associated with the static mapping of resources among partitions.

This brings us to the consideration of the logically partitioned, shared resource system. An example of such a system is the IBM S/390 computer system. A characteristic of logically partitioned, shared resource system is that a logically partitioned resource such as a processor may be shared by more than one partition. This feature effectively overcomes the reconfiguration restraints of the logically partitioned, dedicated resource system.

Figure 4:
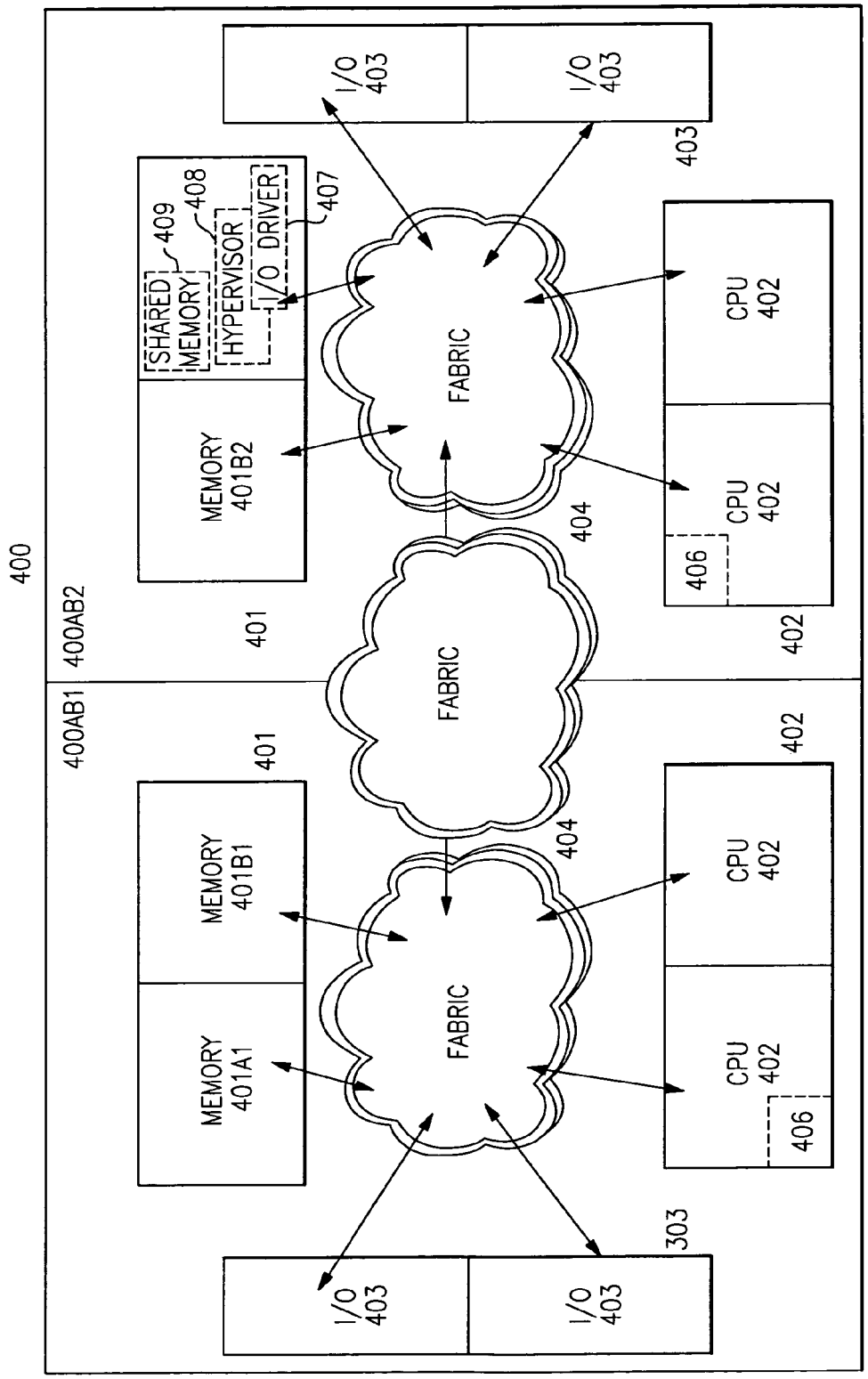
FIG. 4 illustrates a logically partitioned processing system wherein the logically partitioned resource may be dynamically shared between a number of partitions.

FIG. 4 depicts the general configuration of a logically partitioned, resource sharing system 400. Similar to the logically partitioned, dedicated resource system 300, system 400 includes memory 401, processor 402 and I/O resource 403 which may be logically assigned to any partition (A or B in our example) irrespective of its physical location in the system. As can be seen in system 400 however, the logical partition assignment of a particular processor 402 or I/O 403 may be dynamically changed by swapping virtual processors (406) and I/O drivers (407) according to a scheduler running in a "Hypervisor" (408). (A Hypervisor is a supervisory program that schedules and allocates resources for virtual machines). The virtualization of processors and I/O allows entire operating system images to be swapped in an out of operation with appropriate prioritization allowing partitions to share these resources dynamically.

While the logically partitioned, shared resource system 400 provides a mechanism for sharing processor and I/O resource, inter-partition message passing has not been fully addressed by existing systems. This is not to say that the existing partitioned system cannot enable communication among the partitions. In fact, such communication occurs in each type of partitioned system as described herein. However, none of these implementations provides a means to move data from kernel memory to kernel memory without the intervention of a hypervisor, a shared memory implementation, or a standard set of adapters or channel communication devices or network connecting the partitions.

In the physically partitioned multiprocessing systems typified by the Sun Microsystems Ultra Enterprise 10000 system, as described in U.S. Pat. No. 5,931,938, an area of system memory may be accessible by multiple partitions at the hardware level, by setting mask registers appropriately. The Sun patent does not teach how to exploit this capability other than to note that it can be used as a buffering mechanism and communication means for inter partition networks. Aforementioned U.S. patent Ser. No. 09/584,276, Temple et al. teaches how to build and exploit a shared memory mechanism in a heterogeneous partitioned system.

In the IBM S/390 system, as detailed in "Coupling Facility Configuration Options: A Positioning Paper" (GF22-5042-00, IBM Corp.) similar internal clustering capability is described for using commonly addressed physical memory as an "integrated coupling facility". Here the shared storage is indeed a repository, but the connection to it is through an I/O like device driver called XCF. Here the shared memory is implemented in the coupling facility, but requires non S/390 operating systems to create extensions to use it. Furthermore, this implementation causes data to be moved from the one partition's kernel memory to the coupling facility's memory and then to a second partition's kernel memory.

A kernel is the part of an operating system that performs basic functions such as allocating hardware resources. A kernel memory is the memory space available to a kernel for use by the kernel to execute it's function.

By contrast, the present invention provides a means for moving the data from one partition's kernel memory to another partition's kernel memory in one operation using the enabling facilities of a new I/O adapter and its device driver, without providing for shared storage extensions to the operating systems in either partition or in the hardware.

Figure 5:
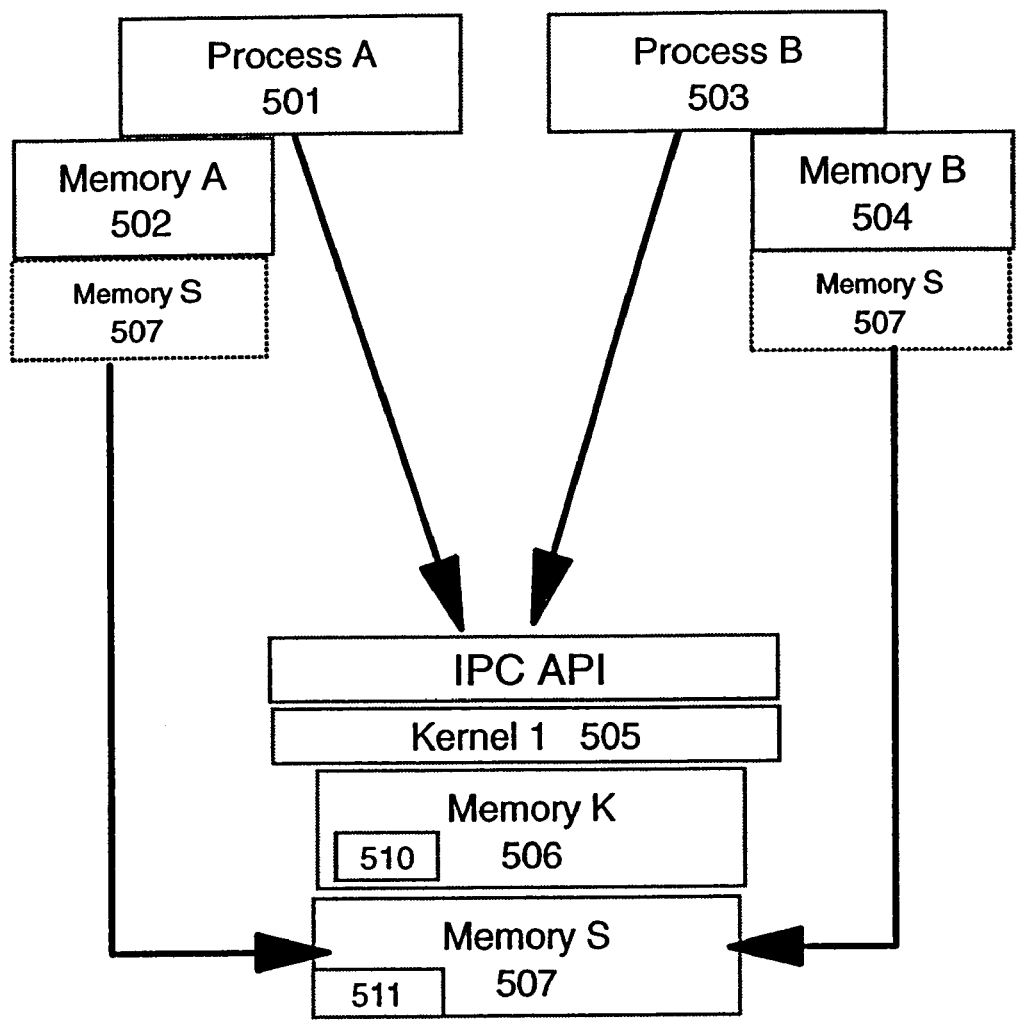
FIG. 5 illustrates the structure of UNIX operating system "Inter Process Communications"

To understand how the present invention is realized, it is useful to understand inter process communications in an operating system. Referring to FIG. 5, Processes A (501) and B (503) each have address spaces Memory A (502) and Memory B (504). These addresses spaces have real memory allocated to them by the execution of system calls by the Kernel (505). The Kernel has its own address space, Memory K (506). In one form of communication, Process A and B communicate by the creation of a buffer 510 in Memory K, by making the appropriate system calls to create, connect to and access the buffer 510. The semantics of these calls vary from system to system, but the effect is the same. In a second form of communication a segment 511 of Memory S (507) is mapped into the address spaces of Memory A (502) and Memory B (504). Once this mapping is complete, then Processes A (501) and B (503) are free to use the shared segment of Memory S (507) according to any protocol which both processes understand.

Figure 6:
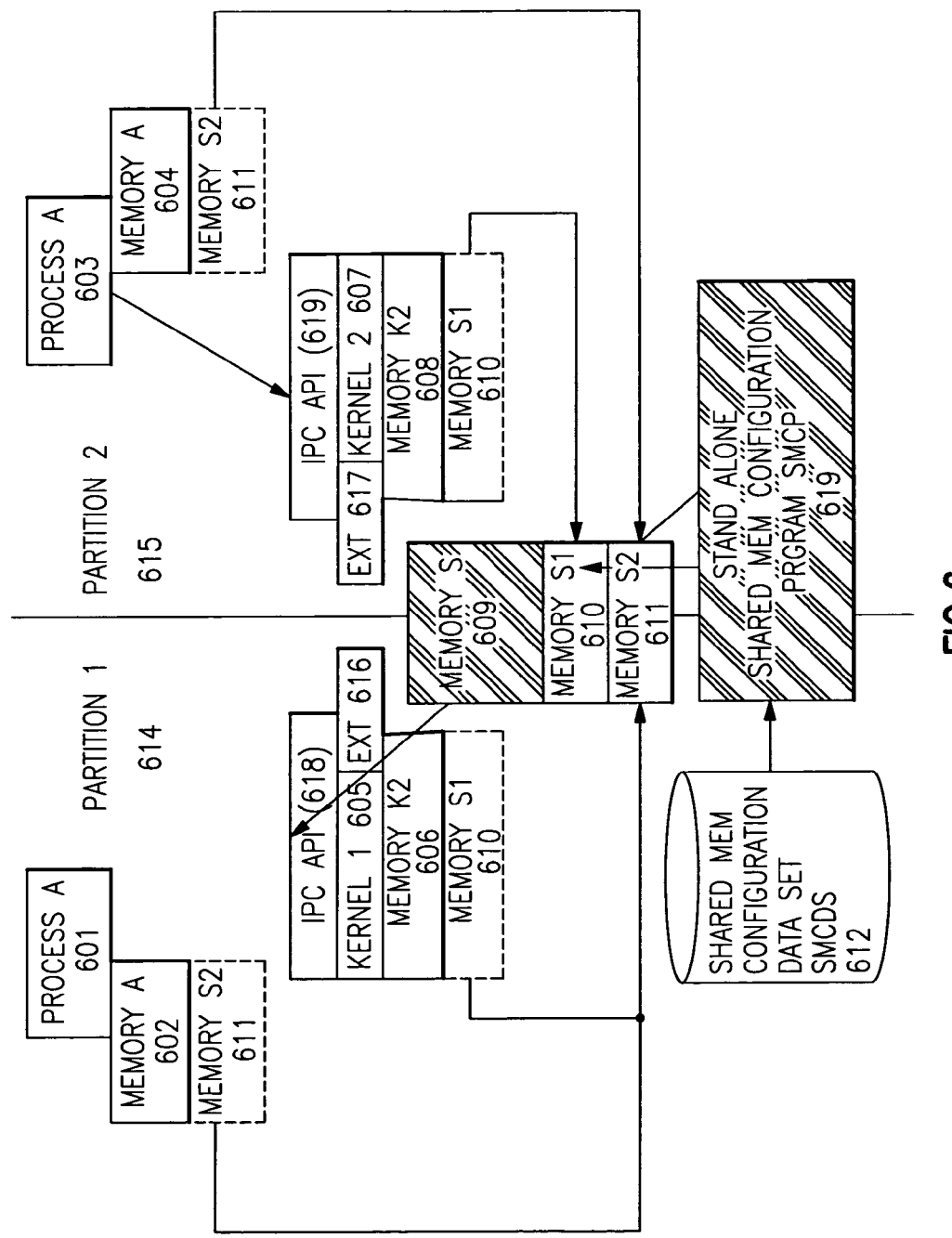
FIG. 6 depicts an embodiment of the invention wherein real memory is shared according to a configuration table which is loaded by a stand alone utility.

U.S. patent Ser. No. 09/583,501 "Heterogeneous Client Server Method, System and Program Product For A Partitioned Processing Environment" is represented by FIG. 6 in which Processes A (601) and B (603) reside in different operating system domains, images, or partitions (Partition 1 (614) and Partition 2 (615)). There are now Kernel 1 (605) and Kernel 2 (607) which have Memory K1 (606) and Memory K2 (608) as their Kernel memories. Memory S (609) is now a space of physical memory accessible by both Partition 1 and Partition 2. The enablement of such sharing can be according to any implementation including without limitation the UE10000 memory mapping implementation or the S/390 hypervisor implementation, or any other means to limit the barrier to access which is created by partitioning. As an alternative example, the shared memory is mapped into the very highest physical memory addresses, with the lead ones in a configuration register defining the shared space.

By convention, Memory S (609) has a shared segment (610) which is used by extensions of Kernel 1 and Kernel 2 which is mapped into Memory K1 and Memory K2. Segment 610 is used to hold the definition and allocation tables for segments of Memory (609), which are mapped to Memory K1 (606) and Memory K2 (608) allowing cross partition communication according to the first form described above or to define a segment S2 (611) mapped into Memory A (602) and Memory B (604) according to the second form of communication described above with reference to FIG. 5. In an embodiment of the invention Memory S is of limited size and is pinned in real storage. However, it is contemplated that memory need not be pinned, enabling a larger share storage space, so long as the attendant page management tasks were efficiently managed.

In a first embodiment of the referenced invention the definition and allocation tables for the shared storage are set up in memory by a stand alone utility program called Shared Memory Configuration Program (SMCP) (612) which reads data from a Shared Memory Configuration Data Set (SM-CDS) (613) and builds the table in segment S1 (610) of Memory S (609). Thus, the allocation and definition of which kernels share which segments of storage is fixed and predetermined by the configuration created by the utility. The various kernel extensions then use the shared storage to implement the various inter-image, inter-process communication constructs, such as pipes, message queues, sockets and even allocating some segments to user processes as shared memory segments according to their own conventions and rules. These inter-process communications are enable through IPC APIs 618 and 619.

The allocation table for the shared storage contains entries which consist of image identifiers, segment numbers, gid, uid, "sticky bit" and permission bits. A sticky bit indicates that the related store is not page-able. In this example embodiment, the sticky bit is reserved and in assumed to be 1 (IE, the data is pinned or "stuck" in memory at this location.). Each group, user, and image which uses a segment has an entry in the table. By convention all kernels can read the table but none can write it. At initialization the kernel extension reads the configuration table and creates its own allocation table for use when cross image inter process communication is requested by other processes. Some or all of the allocated space is used by the kernel for the implementation of "pipes", files and message queues which it creates at the request of other processes which request inter-process communications. A pipe is data from one process directed through a kernel function to a second process. Pipes, files and message queues are standard UNIX operating system inter process communication API's and data structures as used in Linux, OS/390 USS, and most UNIX operating systems. A portion of the shared space may be mapped by a further kernel extension into the address spaces of other processes for direct cross system memory sharing.

The allocation, use of, and mapping shared memory to virtual address spaces is done by each kernel according to its own conventions and translation processes, but the fundamental hardware locking and memory sharing protocols are driven by the common hardware design architecture which underlies the rest of the system.

The higher level protocols must be common in order for communication to occur. In the preferred embodiment this is done by having each of the various operating systems images implement the IPC (Inter Process Communications) API for use with the UNIX operating system, with the extension identifying the request as cross image. This extension can be by parameter or by separate new identifier/command name.

Figure 7A:
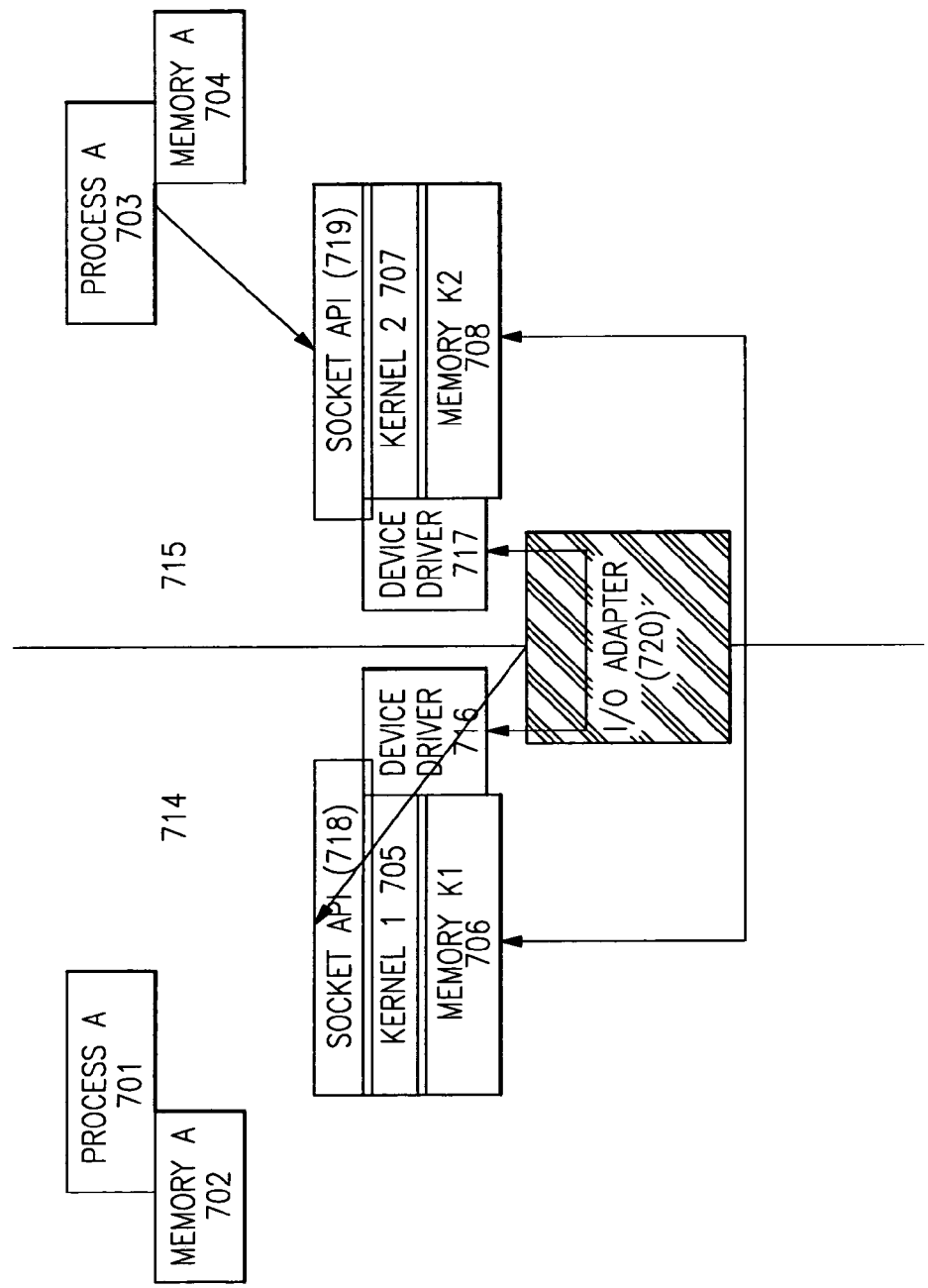
FIG. 7A illustrates an embodiment of the present invention wherein the facilities of an I/O adapter and it's driver are used to facilitate the transfer of data among partitions.

Referring to FIGS. 4 and 7A, one can see that the present invention avoids both the transfer of data over a channel or network connection and the use of a shared memory extension to the operating system. An application process (701) in partition 714 accesses socket interface 708 which calls kernel 1 (705). A socket interface is a construct that relates a specific port of the TCP/IP stack to a listening user process. The kernel accesses the device driver (716) which causes data to be transferred from kernel memory 1 (706) to kernel memory 2 (708), by and through the hardware of the I/O adapter (720) in what looks to the memory (401) like a memory to memory move, bypassing the cache memories implemented in the processors (402) and/or fabric (404) of partitions 714 and 715. Having moved the data I/O adapter then accesses the device driver (717) in partition 715, indicating that the data has been moved. The device driver 717 then indicates to kernel 2 (707) that the socket (719) has data waiting for it. The socket (719) then presents the data to application process (703). Thus, a direct memory to memory move has been accomplished while avoiding the movement of data on exterior interfaces and also avoiding the extension of either operating system for memory sharing.

Figure 7B:
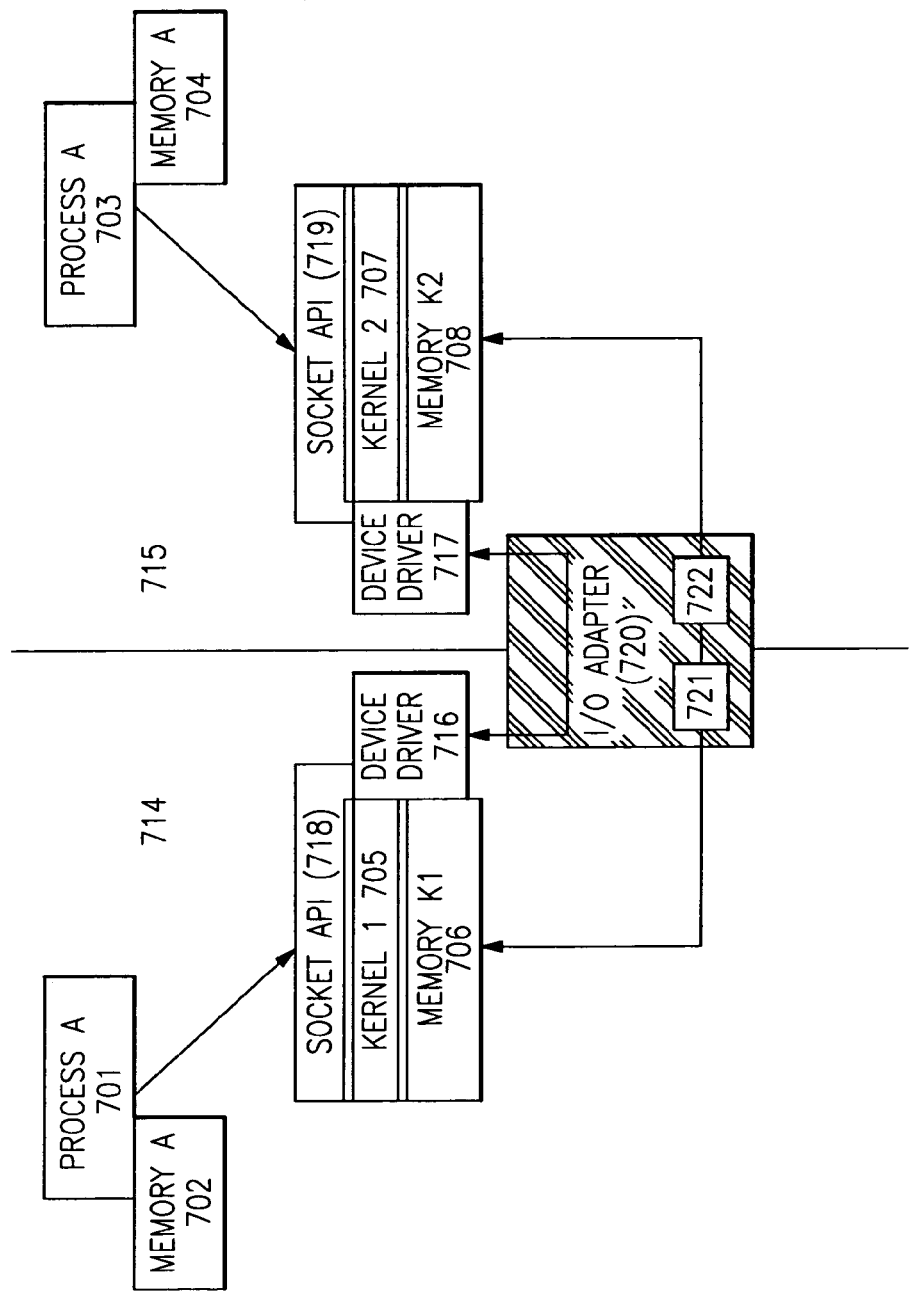
FIG. 7B illustrates a prior art system of the embodiment of FIG. 7A.

By contrast, the prior art system shown in FIG. 7B uses separate memory move operations to move from kernel memory 1 (706) to adapter memory buffer 1 (721). A second memory move operation moves data from adapter memory buffer 1 (721) to adapter memory buffer 2 (722). A third memory mover operation then moves the data from adapter memory buffer 2 (722) to kernel memory 2 (708). This means that three distinct memory move operations are used to move data between the two kernel memories, whereas in the present invention of FIG. 7A, a single memory move operation moves data directly between kernel memory 1 (706) and kernel memory 2 (708). This has the effect of reducing the latency as seen from the user processes.

Figure 8:
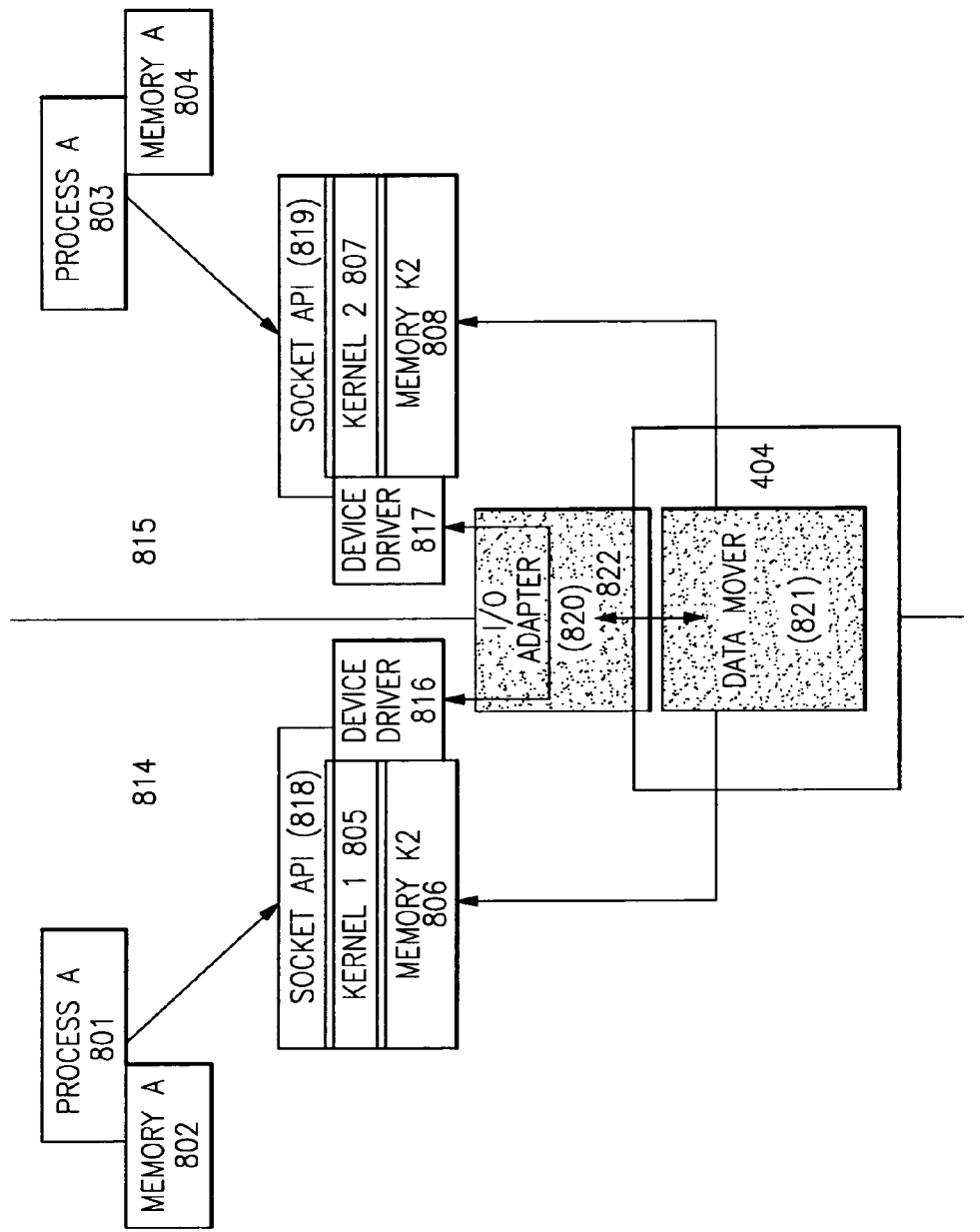
FIG. 8 illustrates an embodiment of the present invention in which the actual data transfer between partitions is accomplished by a data mover implemented in the communication fabric of the partitioned data processing system.

A further embodiment of the present invention is illustrated by FIGS. 4 and 8. Here the actual data mover hardware is implemented (821) in the fabric (404). The operation of this embodiment proceeds as in the description above, except that the data is actually moved by the mover hardware within fabric (404) according to the state of controls (822) in I/O adapter 820.

An example of such a fabric located data mover is described in U.S. Pat. No. 5,269,009, issued Dec. 7, 1993 to Robert D. Herzl, et al., entitled "Processor System with Improved Memory Transfer Means" which is included here by reference in its entirety. The mechanism described in the referenced patent is extended to include transferring data between main storage locations of partitions.

Regardless of the embodiment, the present invention will contain the following elements: An underlying common data movement protocol defined by the design of the CPU, I/O adapter and/or Fabric hardware, a heterogeneous set device drivers implementing the interface to the I/O adapter, a common high level network protocol, which in the preferred embodiment is shown as socket interface, and a mapping of network addresses to physical memory addresses and I/O interrupt vectors or pointers which are used by the I/O adapter (820) to communicate with each partition's kernel memory and device driver.

The data mover may be implemented within an I/O adapter as a hardware state machine, or with microcode and a microprocessor. Alternatively, it may be implemented as in using a data mover in the communication fabric of the machine, controlled by the I/O adapter. An example of such a data mover is described in U.S. Pat. No. 5,269,009 "PROCESSOR SYSTEM WITH IMPROVED MEMORY TRANSFER MEANS, Herzl et al. issued Dec. 7, 1993.

Figure 9:
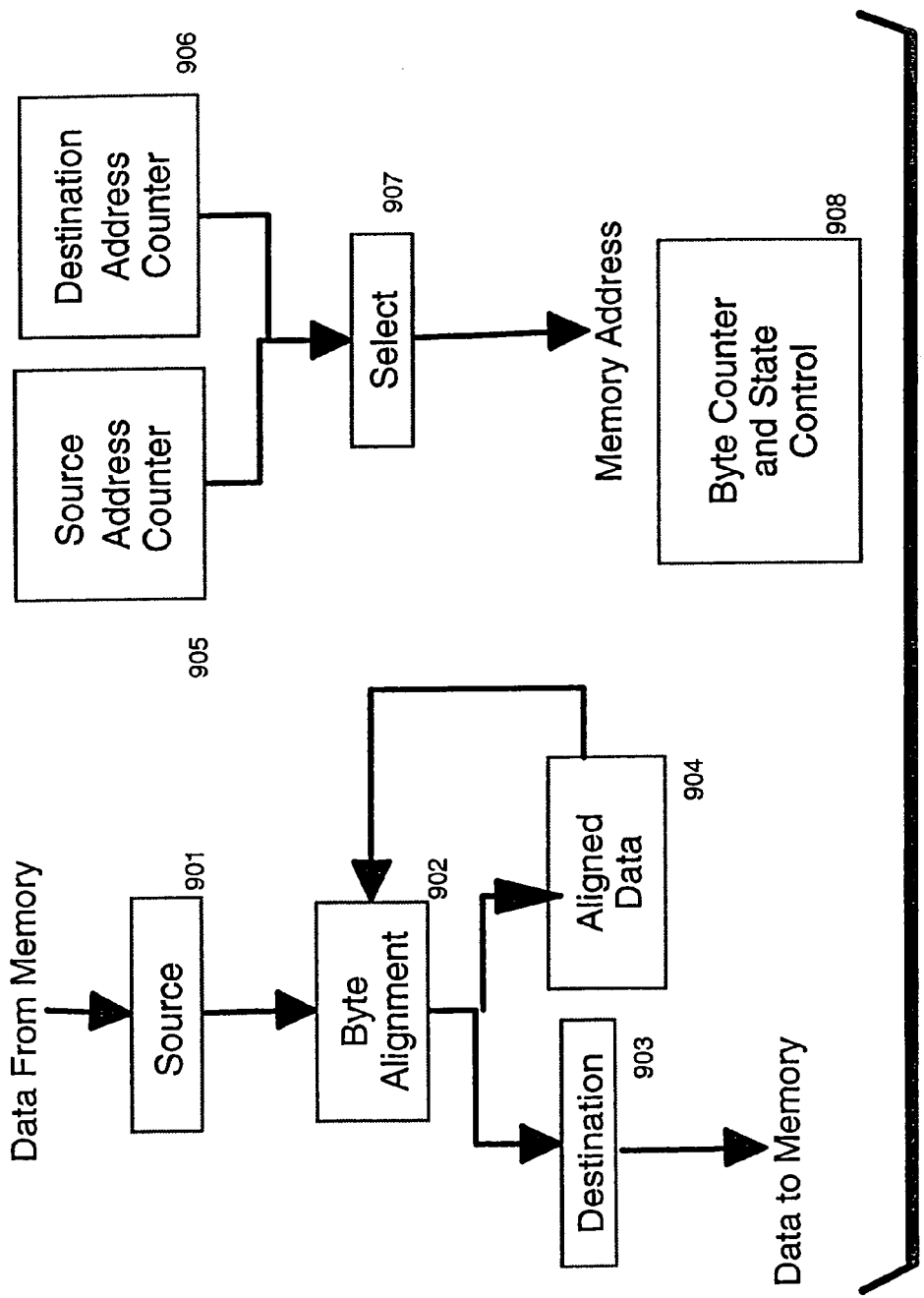
FIG. 9 depicts components of an example data mover.

Referring to FIG. 9, regardless of the implementation the data mover will have the following elements. Data from memory will be kept in a Source register (901), the data is passed through a data aligner (902 and 904) into a destination register (903) and then back to memory. Thus, there is a memory fetch and then a memory store as part of a continuous operation. That is, the alignment process occurs as the multiple words from a memory line are fetched. The aligned data are buffered in the destination register (903) until the memory store is started. The source (901) and destination (903) registers can be used to hold a single line or multiple lines of memory data depending on how much overlap between fetches and stores are being allowed during the move operation. The addressing of the memory is done from counters (905 and 906) which keep track of the fetch and store addresses during the move. The controls and byte count element (908) control the flow of data through the aligner (902 and 904) and cause the selection (907) of the source counter (905) or the destination counter (906) to the memory address. The controller (908) also controls the update of the address counters (905 and 906).

Figure 10:
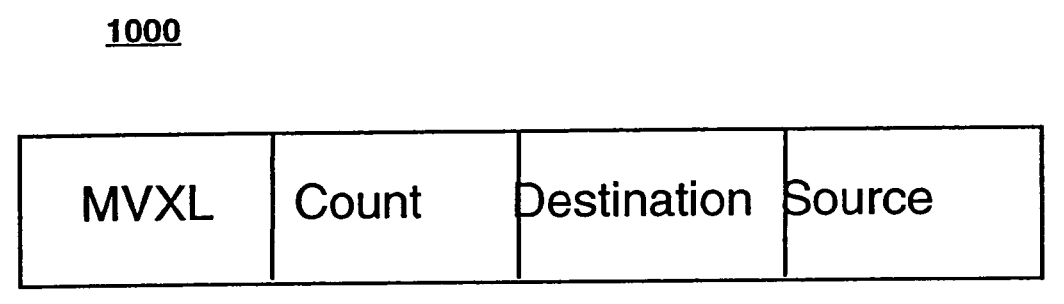

Referring to FIG. 10, the data mover may also be implemented as privileged CISC instruction (1000) implemented by the device driver. Such a CISC instruction make use of hardware facilities in place for intra partition data movement such as the S/390 Move Page, Move Character Long, etc., but would also have the privilege of addressing memory physically according to a table mapping network addresses and offsets, to physical memory addresses. Finally, the data mover and adapter can be implemented by hypervisor code acting as a virtual adapter.

FIG. 11 depicts operation of the data mover when it is in the adapter consisting of the following steps:
1101 User calls Device Driver Supplying:
    Source Network ID
    Source Offset
    Destination Network ID
1102 Device driver transfers addresses to Adapter
1103 Adapter Translates Addresses
    Looks up Physical Base addresses from ID's (Table Lookup)
    Obtains Lock and current Destination Offset
    Adds offsets
    Checks bounds
1104 Adapter loads count and addresses in registers
1105 Adapter executes Data Move
1106 Adapter Frees Lock
1107 Adapter notifies device Driver which "Returns" to user.

FIG. 12 depicts a Data Mover method implemented in the processor communication fabric comprising the following method can be used:
1201 User calls Device Driver Supplying:
    Source Network ID
    Source Offset
    Destination Network ID
1202 Device driver sends addresses to adapter
1203 Adapter Translates Addresses
    Looks up Physical Base addresses from ID's (Table Lookup)
    Obtains Lock and current Destination Offset
    Adds offsets
    Checks bounds
    Adapter Returns Lock and Physical addresses to Device Driver
1204 Device Driver executes Data Move
1205 Device Driver Frees Lock
1206 Device Driver Returns Thus, we have described two ways to implement heterogeneous inter operation in a partitioned computing system. One uses a shared memory facility and extensions to the operating system kernels to enable cross partition inter process communications protocols, and the other uses the ability of a shared I/O adapter to address all physical memory to implement memory to memory message passing in a single operation.

The foregoing constructs give rise to number of inventive implementations which take advantage of the single system client-server model. One way to implement the construct is that put the server work queue in the shared storage space allowing various clients to append requests. The return buffers for the "remote" clients must then also be in the shared memory space so that the clients can access the information put there. Alternatively existing network oriented client/server can be quickly and easily deployed using the message passing scheme described above. These implementations are provided by way of illustration and while new and inventive should not be considered as limiting. Indeed it is readily understood that those of skill in the art can and will build upon this construct in various ways implementing different types of heterogeneous client-server systems within the single system paradigm.

Figure 13:
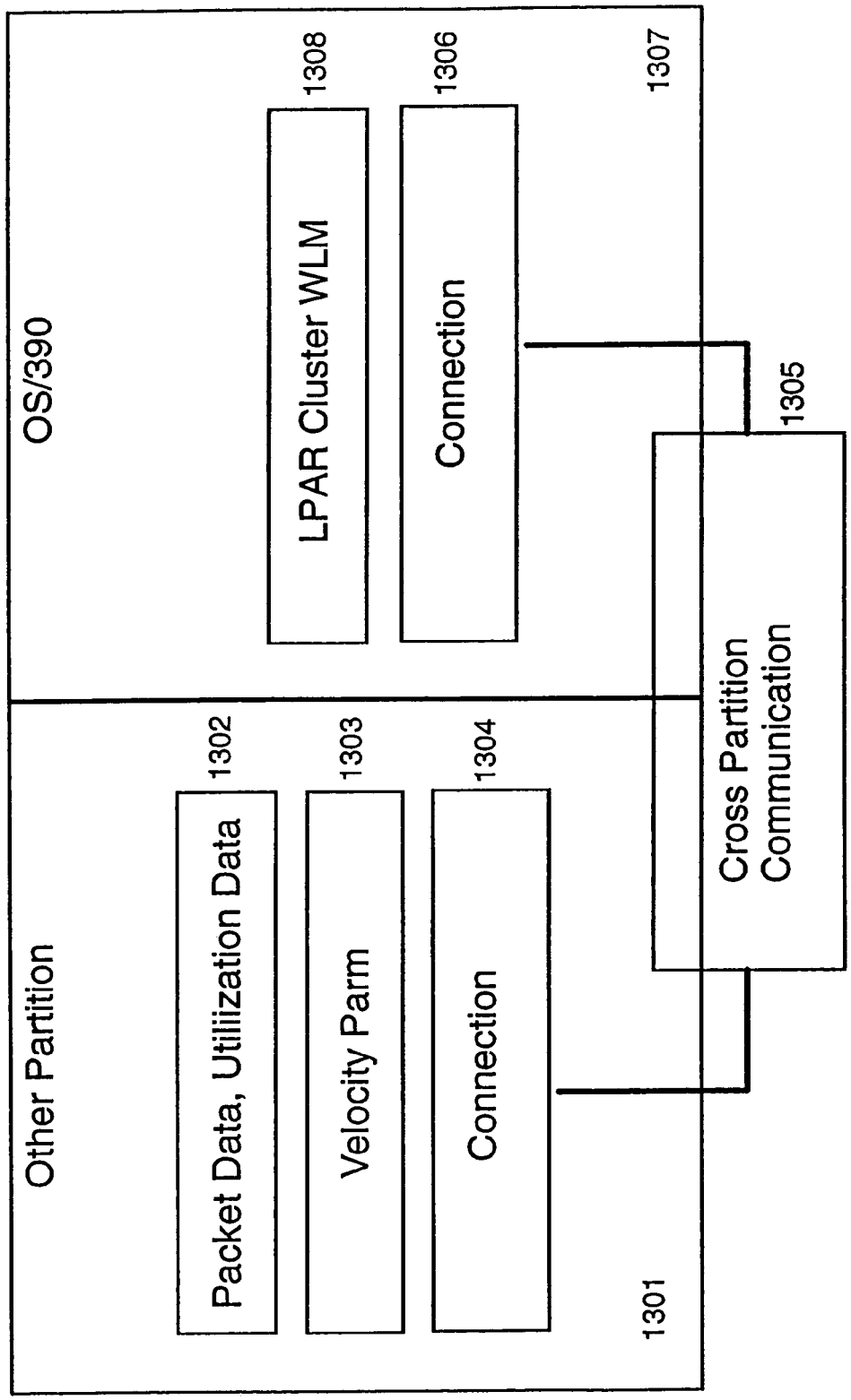
FIG. 13 is a high level view of a Workload Manager (WLM)

Workload Management of a Cluster of Partitions:

Referring to FIG. 13, the OS/390 operating system Workload Manager (WLM) (1308) is capable of communicating with the partition hypervisor of an S/390 to adjust the resources allocated to each partition. This is known as LPAR clustering. However, for non OS/390 partitions (1301), the WLM must do the allocation based solely on the utilization and other information that can be supplied by the hypervisor, and not based on the partition's operating system or applications. Use of the low latency cross partition communications (1305) shown above, to pipe information from the partition to the WLM (1308) is a very low overhead means to get WLM (1308) the information it needs to do a better job of allocating cross system resources. This can be effective even in cases where the application is not instrumented for workload management, because typically the system being controlled can typically implement the UNIX operating system "NETSTAT" a command that accesses a packet activity counter in the TCP/IP stack (part of the UNIX operating system standard command library), which counts IP packets in and out of the system and also run the UNIX operating system "VMSTAT" a standard UNIX operating system command that accesses an system activity counter in the kernel that counts busy and idle cycles (part of the UNIX operating system standard command library), which generates utilization data (1302). It will be understood that it is not necessary to use the existing NETSTAT and VMSTAT commands, but rather it is best to use the underlying mechanisms which supply them with packet counts and utilization, to minimize resource and path length costs. By combining this data into a "Velocity" metric (1303) and shipping it to the Workload Manager (WLM) partition (1307) the WLM (1308) can then cause the hypervisor to make resource adjustments. If the CPU utilization is high and the packet Traffic is low, the partition needs more resource. Connections (1304 and 1306) will vary depending on the embodiment of the interconnect (1305). In a shared memory embodiment these could be a UNIX operating system PIPE, Message Q, SHMEM or socket constructs. In a data mover embodiment these would typically be socket connections.

In one embodiment of the present invention the "velocity" metric is arrived at (Reference UNIX operating system Commands NETSTAT and VMSTAT described in IBM Redbook Document SG24-4810-01 "Understanding RS/6000 Performance and Sizing",) in the following way:

The interval data for (NETSTAT) total packets is used to profile throughput.

The interval CPU data (VMSTAT) is used to profile CPU utilization.

These are plotted and displayed with traffic normalized with it's peak at 1. (1401)

A cumulative correlation analysis is done of the Traffic v CPU. (1402)

The relationship of Traffic is curve fitted to a function T(C).

In our example (1402) $T(C)=0.864+1.12C$ $S=dT/dC$ is the velocity metric

In our example $S=1.12$

When S is smaller than the trend line more resources are needed.

Figure 14:
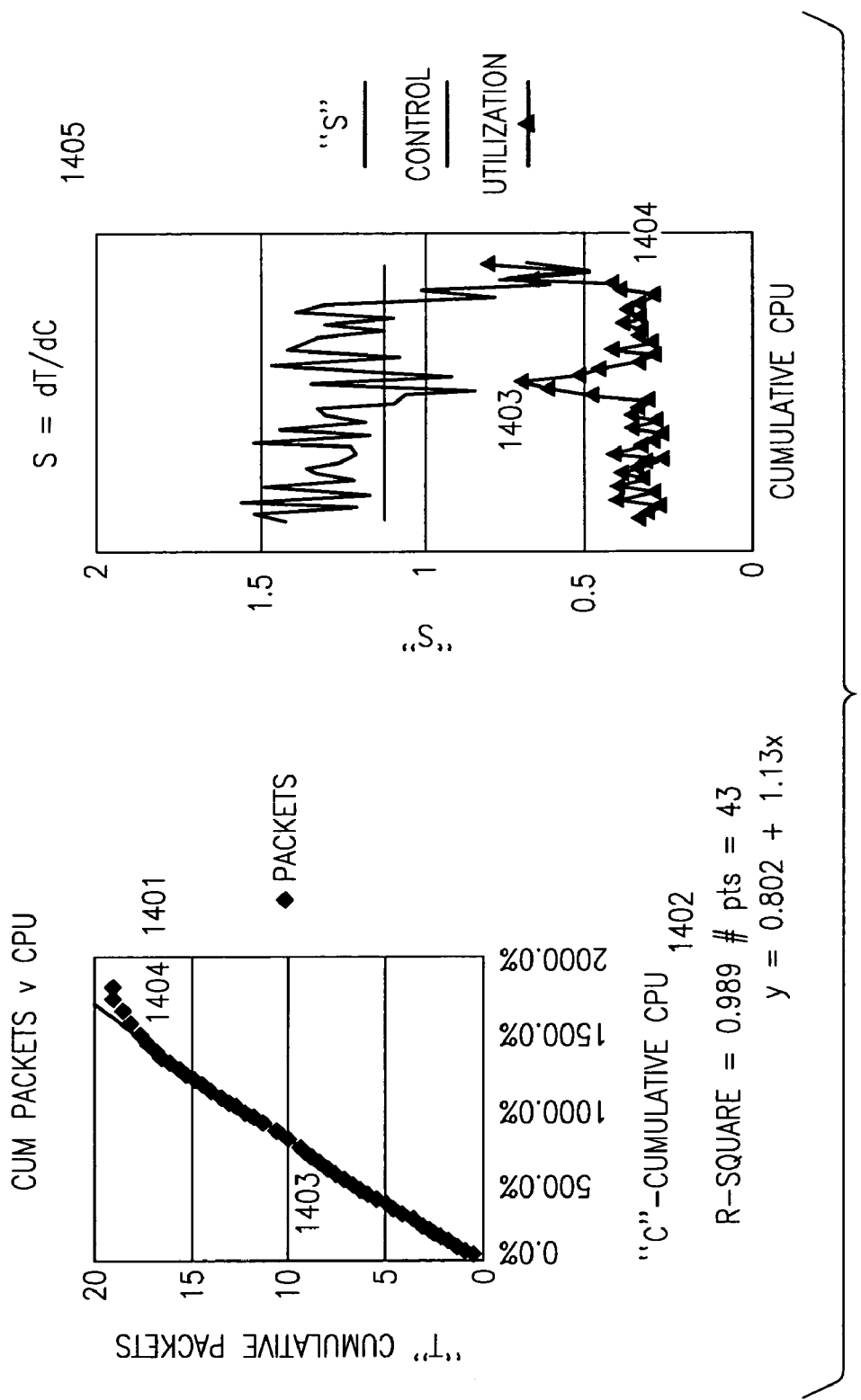
FIG. 14 illustrates typical Workload Management Data.

In the example of FIG. 14, this occurs twice (1403 and 1404). Control charts are a standard method for creating monitoring processes in industries. S is plotted dynamically as a control chart in 1405. Given a relationship such as we have seen between packet traffic and CPU, it is possible to monitor and arrange collected data in a variety of ways, based on statistical control theory. These methods typically rely on threshold values of the control variable which triggers action. As with all feedback systems, it is necessary to cause the action promptly upon the determination of a near out of control state, otherwise the system can become unstable. In the present invention this is effected by the low latency connection that internal communications provides.

In a static environment, S can be used to establish at which utilization more resources are needed. While this works over the average S is also a function of workload and time. Referring to FIG. 14, one can see first that this appears to be somewhere between 50 and 60% and second that the troughs in S lead the peaks in utilization by at least one time interval. Therefore WLM will do a better job if it fed S rather than utilization, because S is a "leading indicator" allowing more timely adjustment of resources. Since the resources of the partitioned machine are shared by the partitions, the workload manager must get the S data from multiple partitions. The transfer of data needs to be done at very low overhead and at a high rate. The present invention enables both of these conditions. Referring to FIG. 13, in a partition without a workload manager (1301), the monitors gather utilization and packet data (1302) which is used by a program step (1303) to evaluate parameter (in our example "S"). The program then uses a connection (1304) to a low latency cross partition communications facility (1305) which then passes it to a connection (1306) in a partition with a workload manager (1307), which connects provides input to an "Logical Partition Cluster Manager" (1308) which is described in U.S. patent Ser. No. 09/677,338 filed Oct. 2, 2000 for METHOD AND APPARATUS FOR ENFORCING CAPACITY LIMITATIONS IN A LOGICALLY PARTITIONED SYSTEM owned by the assignee of the present invention and incorporated herein by reference.

In this case, the most efficient way to communicate the partition data to the workload manager is through memory sharing, but the internal socket connection will also work if the socket latency is low enough to allow for time delivery of the data. This will depend both on the workload and upon the granularity of control required.

While the above is a new and inventive way to supply information for a Workload manager to allocate resources, it should not be taken as limiting in any way. This example is chosen because it is a metric that can be garnered from most if not all operating systems without a lot of new code. The client system can implement any instrumentation of any metric to be passed to the WLM server such as response times or user counts.

Indirect I/O

Figure 15:
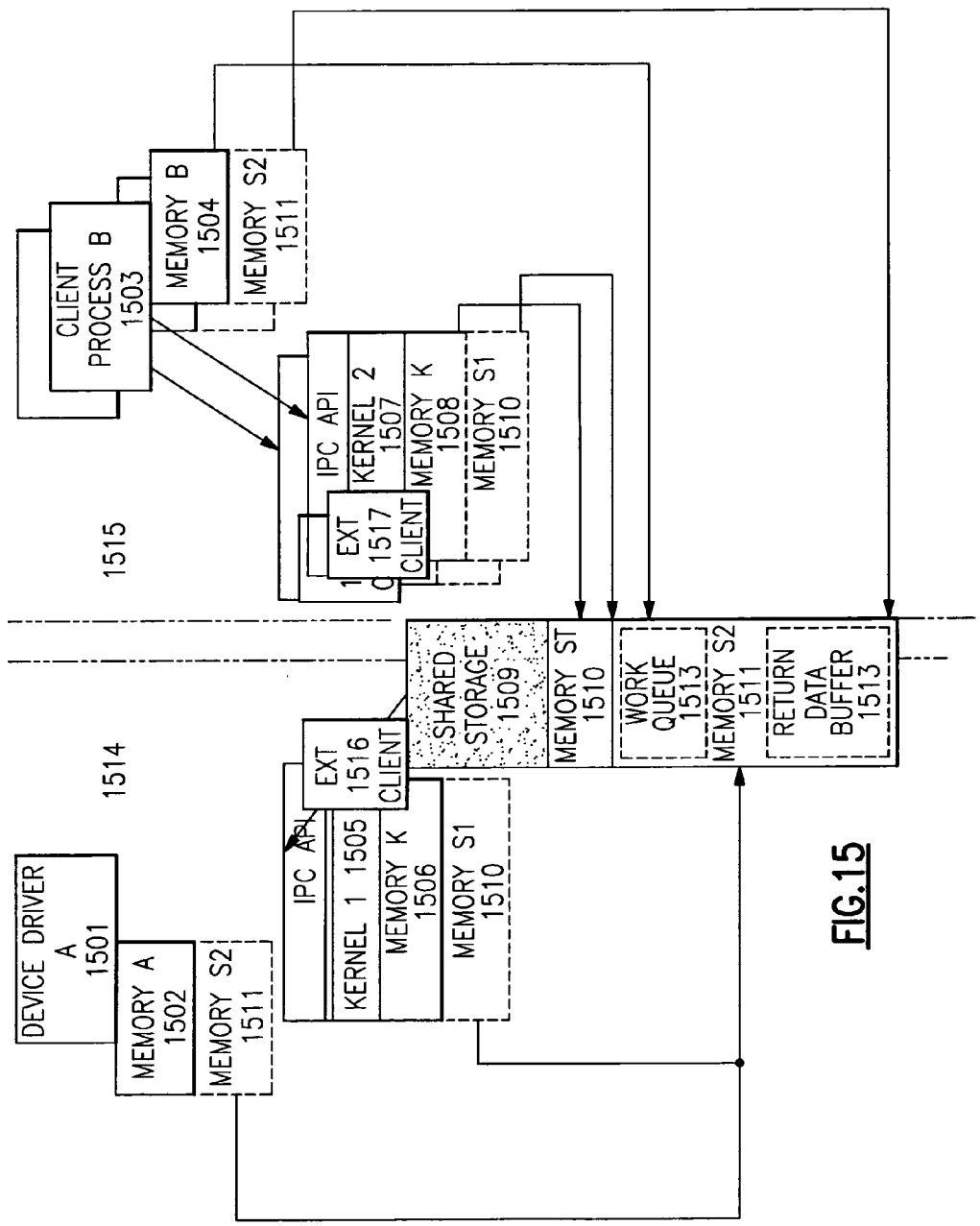
FIG. 15 depicts clustering of client/server using indirect I/O.

Sometimes a device driver will be available only on one of the possible operating systems supported by the hardware. By presenting the device driver memory interface in the shared memory and observing the driver protocol by all attaching systems, the device can be shared by multiple systems. In effect, one partition can become an IOP for the others. Access to the device approaches single system levels with the understanding that overloading the device will have the same negative consequences as overloading it from a single system. Referring to FIG. 15, Device Driver (1501) responds to request for I/O service from applications and access methods (1503) through shared memory (1511).

It is possible to use the message passing embodiments for some devices, but the latency of the socket, stack and data movement would have to be accepted. One could look at this as somewhere between native and network attached devices.

A further enhancement is obtained if the processor resources allocated to system images running the device drivers are separated from the processor resources allocated to system images running the applications. When this is done the disruption of cache and program flow due to I/O interrupts and associated context switching is avoided in the processors which are not targeted for I/O interrupts.

Common Security Server

Figure 16:
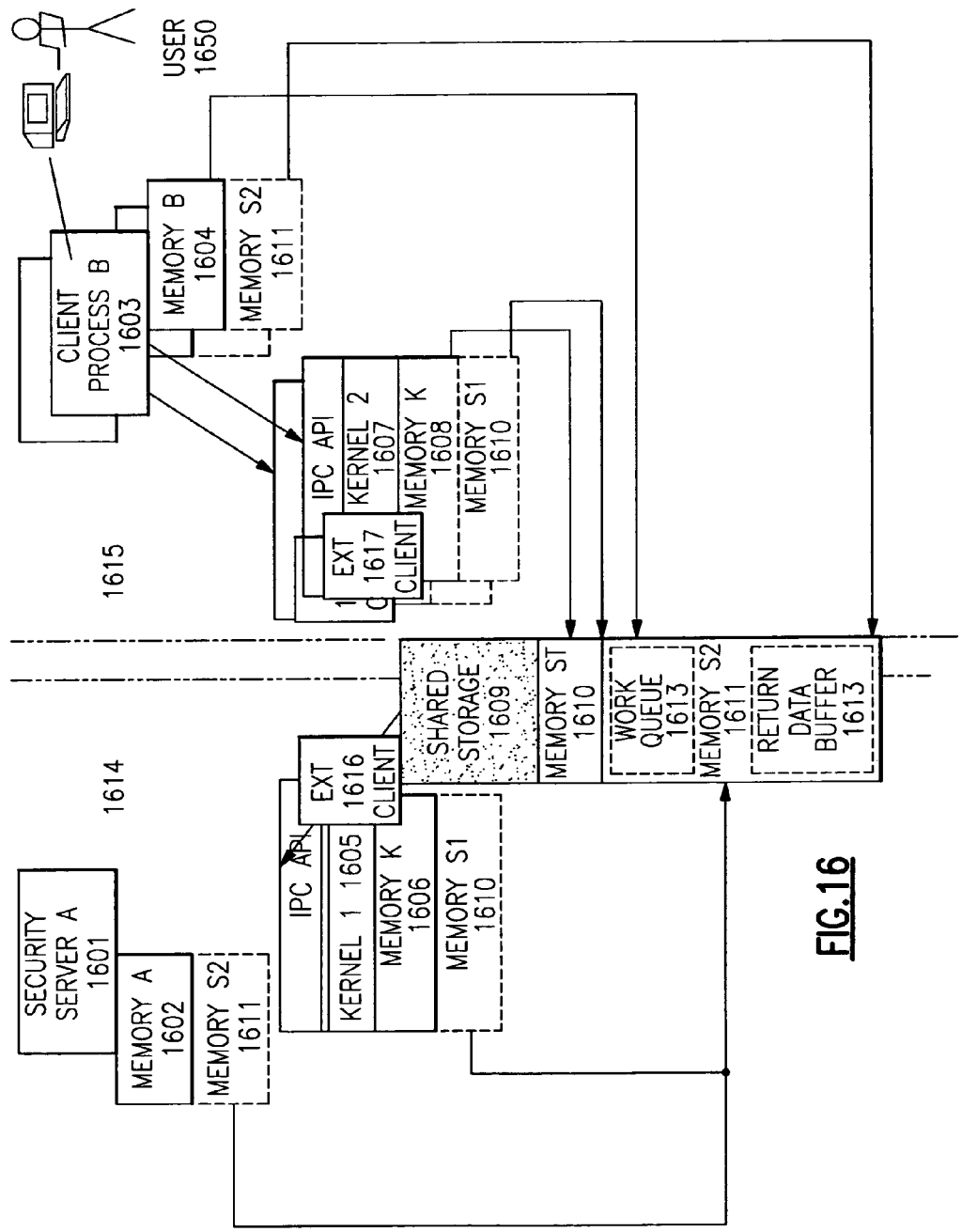
FIG. 16 depicts server clustering of client/server.

As applications are web enabled and integrated, validating users and establishing entitlement become more pervasive issues than in classical systems. Compounding this is the need to bring heterogeneous systems together to integrate applications. As a result the use of LDAP, Kerberos, RACF, and other security function in an integrated manner usually requires a network connection to a common security server to perform security functions. This has an impact on performance. There is also the security exposure of network sniffers. If the common security server is connected to the web servers via a shared memory connection or memory mover connection, this activity can be speeded up considerably and the connection is internalized improving security. Furthermore, in such an environment some customers may opt for the increased security of an S/390 "RACF", or other OS/390 "SAF" interface user authentication over other UNIX operating system based password protection, particularly in the case of LINUX. The Linux system makes it relatively easy to build the client side for such a shared server because the user authentication is done there by a "pluggable authentication module" which is intended to be adapted and customized. Here, the security server is accessed via a shared memory interface or memory to memory data mover interface, which the web servers contend for. The resulting queue of work is then run by the security server responding as required back through the shared memory interface. The result is delivery of enhanced security and performance for web applications. Referring to FIG. 16, the security server (1601) responds to requests for access from user processes (1603) through shared memory (1611). The user process uses a standard Inter Process Communication (IPC) interface to the security client process (this is the PAM in the LINUX case) in Kernel 2 (1607) which would then communicate through shared memory (1610) to a kernel process in kernel 1 (1605) which would then drive the security server interface (SAF in the case of OS/390 or Z/OS) as a proxy for the user processes (1603), returning the authorization to the security client in kernel 2 (1607) through the shared memory (1610).

In another embodiment of the present invention the data placed in shared memory is moved between kernel memory 1 (1606) to kernel memory 2 (1608) via a single operation data mover, avoiding the development of shared memory but also avoiding a network connection.

An example of an implementation of communications steps in a security server of the present invention for providing security for a partitioned processing system wherein common security server (1601) is run in a first partition (1614) and at least one security client (or proxy) (1603) is run in at least one second partition (1615) follows:

A user requests authorization. The security client (1603) receives a password from the user. The security client puts the request in a memory location accessible to the security server (1610) and signals that it has done so. A "security daemon" in the first partition (1614) recognizes the signal and starts a "proxy" client (1616) in the first partition (1614). The proxy (1616) client calls the security server with the request using the interface native to the security server (1601). The security server (1601) processes the request and returns the servers response to the proxy client (1616). The proxy client puts the security server's response in memory accessible to the security client in the second partition and signals that it has done so. The signal wakes up the security client (1603) pointing to the authorization. The security client (1603) passes the response back to the user. In one embodiment, the security client (1603) in the second partition (1615) communicates with the security server (1601) in the first partition (1614) by means of a shared memory interface (1609), thus avoiding the security exposure of a network connection and increasing performance. In another embodiment, the security client in the second partition communicates with the security server in the first partition by means of an internal memory-to-memory move using a data mover (821) shown in FIG. 8. Referring to FIG. 8, this second embodiment implements the security client as process A (803)and the security proxy is implemented as process B (801) thus avoiding an external network connection and avoiding implementation of shared memory.

Although preferred embodiments have been depicted and described in detail herein, it will be apparent to those skilled in the relevant art that various modifications, additions, substitutions and the like can be made without departing from the spirit of the invention, and these are therefore considered to be within the scope of the invention as defined in the following claims.

We claim:

1. A system for the collection and analysis of computer system capacity data in a partitioned computer system having a computer system first partition and a computer system second partition, the system comprising:
    a network;
    a partitioned computer system in communication with the network wherein the partitioned computer system includes instructions to execute a method comprising the steps of:
        a) an analysis application running in a computer system second partition obtaining throughput information of a computer system first partition by way of a shared portion of memory, the shared portion of memory programmably accessible to both partitions, the shared memory for transferring information between the computer system first partition and the computer system second partition;
        b) the analysis application obtaining resource utilization information of the computer system first partition by way of a shared portion of memory;
        c) the analysis application calculating a resource control parameter using the resource utilization information obtained and the throughput information obtained, the resource control parameter comprising curve fitted throughput information as a function of resource utilization, wherein the curve fitted throughput information is derived from the throughput information obtained;
        d) providing the resource control parameter to a user agent, the resource control parameter indicating real time resource performance; and
        e) the user agent displaying the resource control parameter at a terminal.

2. The system according to claim 1 wherein the resource utilization information comprises CPU utilization.

3. The system according to claim 1 comprising the further step of the user agent displaying at a terminal, the resource control parameter wherein the resource control parameter comprises the throughput information as a function of resource utilization.

4. The system according to claim 1 comprising the further step of the user agent displaying as a graph at a terminal the resource control parameter, the display comprising effective utilization versus resource utilization wherein effective utilization derived in the calculating step comprises change in throughput divided by change in resource utilization.

5. The system according to claim 4 comprising the further step of the user agent displaying at a terminal a mark, the mark indicating the utilization at which the effective utilization is half of its maximum.

6. The system according to claim 1 comprising the further step of the user agent using the resource control parameter to adjust resources allocated to the first partition.

7. The system according to claim 6 wherein the using step is performed by a workload manager.

8. The system according to claim 7 wherein the workload manager is in a third partition.

9. The system according to claim 6 wherein the workload is managed by modifying resources allocated to the first partition.

10. The system according to claim 9 wherein the resources include I/O.

11. The system according to claim 9 wherein the resources include memory.

12. The system according to claim 9 wherein the resources include processors.

13. The system according to claim 6 wherein the workload is managed dynamically.

14. The system according to claim 1 comprising the further step of providing the throughput information and the resource utilization information for the calculating step using a single operation memory to memory transfer function.

15. The system according to claim 1 wherein the throughput information comprises network packet counts.

16. The system according to claim 1 wherein the throughput information comprises an inverse throughput.

17. The system according to claim 1
wherein the throughput information obtained comprises a network packet activity comprising a count of packets in and out of the system during an interval of time, wherein further the resource utilization obtained comprises CPU utilization during the interval of time, wherein the resource control parameter calculated comprises a representation of a relationship between the throughput information obtained and the resource utilization obtained.

18. The system according to claim 17 comprising the further step of providing any one of the throughput information or the resource utilization information for the calculating step by way of a shared portion of memory, the shared portion of memory programmably accessible to both partitions, the shared memory for transferring information between the computer system first partition and the computer system second partition.

19. A computer program product for the collection and analysis of computer system capacity data in a partitioned computer system having a computer system first partition and a computer system second partition, the computer program product comprising:
a storage medium readable by a processing circuit and storing instructions for execution by a processing circuit for performing a method comprising the steps of:
  a) an analysis application running in a computer system second partition obtaining throughput information of a computer system first partition by way of a shared portion of memory, the shared portion of memory programmably accessible to both partitions, the shared memory for transferring information between the computer system first partition and the computer system second partition;
  b) the analysis application obtaining resource utilization information of the computer system first partition by way of a shared portion of memory;
  c) the analysis application calculating a resource control parameter using the resource utilization information obtained and the throughput information obtained, the resource control parameter comprising curve fitted throughput information as a function of resource utilization, wherein the curve fitted throughput information is derived from the throughput information obtained;
  d) providing the resource control parameter to a user agent, the resource control parameter indicating real time resource performance; and
  e) the user agent displaying the resource control parameter at a terminal.

20. The computer program product according to claim 19 wherein the resource utilization information comprises CPU utilization.

21. The computer program product according to claim 19 comprising the further step of the user agent displaying at a terminal, the resource control parameter wherein the resource control parameter comprises the throughput information as a function of resource utilization.

22. The computer program product according to claim 19 comprising the further step of the user agent displaying as a graph at a terminal the resource control parameter, the display comprising effective utilization versus resource utilization wherein effective utilization derived in the calculating step comprises change in throughput divided by change in resource utilization.

23. The computer program product according to claim 22 comprising the further step of the user agent displaying at a terminal a mark, the mark indicating the utilization at which the effective utilization is half of its maximum.

24. The computer program product according to claim 19 comprising the further step of the user agent using the resource control parameter to adjust resources allocated to the first partition.

25. The computer program product according to claim 24 wherein the using step is performed by a workload manager.

26. The computer program product according to claim 25 wherein the workload manager is in a third partition.

27. The computer program product according to claim 24 wherein the workload is managed by modifying resources allocated to the first partition.

28. The computer program product according to claim 27 wherein the resources include I/O.

29. The computer program product according to claim 27 wherein the resources include memory.

30. The computer program product according to claim 27 wherein the resources include processors.

31. The computer program product according to claim 24 wherein the workload is managed dynamically.

32. The computer program product according to claim 19 comprising the further step of providing the throughput information and the resource utilization information for the calculating step using a single operation memory to memory transfer function.

33. The computer program product according to claim 19 wherein the throughput information comprises network packet counts.

34. The computer program product according to claim 19 wherein the throughput information comprises an inverse throughput.

35. The computer program product according to claim 19 wherein the throughput information obtained comprises a network packet activity comprising a count of packets in and out of the system during an interval of time, wherein further the resource utilization obtained comprises CPU utilization during the interval of time, wherein the resource control parameter calculated comprises a representation of a relationship between the throughput information obtained and the resource utilization obtained.

36. The computer program product according to claim 35 comprising the further step of providing any one of the throughput information or the resource utilization information for the calculating step by way of a shared portion of memory, the shared portion of memory programmably accessible to both partitions, the shared memory for transferring information between the computer system first partition and the computer system second partition.

37. A computer implemented method for the collection and analysis of computer system capacity data in a partitioned computer system having a computer system first partition and a computer system second partition, the method comprising the steps of:
  a) an analysis application running in a computer system second partition obtaining throughput information of a computer system first partition by way of a shared portion of memory, the shared portion of memory programmably accessible to both partitions, the shared memory for transferring information between the computer system first partition and the computer system second partition;
  b) the analysis application obtaining resource utilization information of the computer system first partition by way of a shared portion of memory;
  c) the analysis application calculating a resource control parameter using the resource utilization information obtained and the throughput information obtained, the resource control parameter comprising curve fitted throughput information as a function of resource utilization, wherein the curve fitted throughput information is derived from the throughput information obtained;
  d) providing the resource control parameter to a user agent, the resource control parameter indicating real time resource performance; and
  e) the user agent displaying the resource control parameter at a terminal.

38. The method according to claim 37 wherein the resource utilization information comprises CPU utilization.

39. The method according to claim 38 comprising the further step of providing the throughput information and the resource utilization information for the calculating step using a single operation memory to memory transfer function.

40. The method according to claim 37 comprising the further step of the user agent displaying at a terminal, the resource control parameter wherein the resource control parameter comprises the throughput information as a function of resource utilization.

41. The method according to claim 37 comprising the further step of the user agent displaying as a graph at a terminal the resource control parameter, the display comprising effective utilization versus resource utilization wherein effective utilization derived in the calculating step comprises change in throughput divided by change in resource utilization.

42. The method according to claim 41 comprising the further step of the user agent displaying at a terminal a mark, the mark indicating the utilization at which the effective utilization is half of its maximum.

43. The method according to claim 37 comprising the further step of the user agent using the resource control parameter to adjust resources allocated to the first partition.

44. The method according to claim 43 wherein the using step is performed by a workload manager.

45. The method according to claim 44 wherein the workload manager is in a third partition.

46. The method according to claim 43 wherein the workload is managed by modifying resources allocated to the first partition.

47. The method according to claim 46 wherein the resources include I/O.

48. The method according to claim 46 wherein the resources include memory.

49. A method according to claim 46 wherein the resources include processors.

50. A method according to claim 43 wherein the workload is managed dynamically.

51. A method according to claim 37 wherein the throughput information comprises network packet counts.

52. A method according to claim 37 wherein the throughput information comprises an inverse throughput.

53. The method according to claim 37
  wherein the throughput information obtained comprises a network packet activity comprising a count of packets in and out of the system during an interval of time, wherein further the resource utilization obtained comprises CPU utilization during the interval of time, wherein the resource control parameter calculated comprises a relationship between the throughput information obtained and the resource utilization obtained.

54. The method according to claim 53 comprising the further step of providing any one of the throughput information or the resource utilization information for the calculating step by way of a shared portion of memory, the shared portion of memory programmably accessible to both partitions, the shared memory for transferring information between the computer system first partition and the computer system second partition.

* * * * *